(12) United States Patent
Lantz

(10) Patent No.: US 12,104,721 B2
(45) Date of Patent: Oct. 1, 2024

(54) UNIVERSAL TUBE STUB PLUG WITH SEAL PORT

(71) Applicant: Compart Systems Pte. Ltd., Singapore (SG)

(72) Inventor: John C. Lantz, Dallas, TX (US)

(73) Assignee: Compart Systems Pte. Ltd., Singapore (SG)

( * ) Notice: Subject to any disclaimer, the term of this patent is extended or adjusted under 35 U.S.C. 154(b) by 492 days.

(21) Appl. No.: 16/718,139

(22) Filed: Dec. 17, 2019

(65) Prior Publication Data

US 2020/0300392 A1     Sep. 24, 2020

Related U.S. Application Data

(60) Provisional application No. 62/819,267, filed on Mar. 15, 2019, provisional application No. 62/780,795, filed on Dec. 17, 2018.

(51) Int. Cl.
*F16L 21/08*     (2006.01)
*F16L 41/03*     (2006.01)

(52) U.S. Cl.
CPC .............. *F16L 21/08* (2013.01); *F16L 41/03* (2013.01)

(58) Field of Classification Search
CPC . F16L 21/08; F16L 25/04; F16L 25/08; F16L 41/03; F16L 41/14
USPC ............ 285/124.5, 124.3, 124.4, 92, 91, 90
See application file for complete search history.

(56) References Cited

U.S. PATENT DOCUMENTS

| | | | |
|---|---|---|---|
| 3,278,156 A | 10/1966 | Callahan et al. | |
| 3,521,910 A | 7/1970 | Callahan et al. | |
| 5,730,423 A | 3/1998 | Wu et al. | |
| 5,803,507 A | 9/1998 | Vu | |
| 6,357,760 B1 | 3/2002 | Doyle | |
| 6,640,835 B1 | 11/2003 | Rohrberg et al. | |
| 7,938,452 B2 * | 5/2011 | Katsura | F16L 47/041 |
| | | | 137/550 |
| 8,496,029 B2 | 7/2013 | Vu | |
| 2002/0050299 A1 | 5/2002 | Nguyen | |
| 2008/0041479 A1 | 2/2008 | Perusek et al. | |
| 2010/0270795 A1 | 10/2010 | Itou et al. | |
| 2015/0264859 A1 | 9/2015 | Morrissey | |
| 2018/0348799 A1 | 12/2018 | Farzaneh et al. | |

FOREIGN PATENT DOCUMENTS

| | | |
|---|---|---|
| CN | 1374474 A | 10/2002 |
| CN | 101372991 A | 2/2009 |
| CN | 101382219 A | 3/2009 |
| CN | 101896755 A | 11/2010 |
| CN | 205664039 U | 10/2016 |
| CN | 107850010 A | 3/2018 |
| CN | 109000081 A | 12/2018 |
| EP | 2 224 155 A1 | 9/2010 |

(Continued)

OTHER PUBLICATIONS

Japan Patent Office; Examination Report issued in counterpart application JP 2021-534676; Date of Report Dec. 19, 2023.

*Primary Examiner* — Aaron M Dunwoody
(74) *Attorney, Agent, or Firm* — Dykema Gossett PLLC

(57) ABSTRACT

A fluid substrate comprising a manifold including a circular opening, a tube stub plug coupled with the manifold at the circular opening, wherein an anti-rotation feature prevents the tube stub plug from rotating with respect to the manifold.

9 Claims, 22 Drawing Sheets

(56) References Cited

FOREIGN PATENT DOCUMENTS

| | | | |
|---|---|---|---|
| GB | 1135444 | A | 12/1968 |
| JP | 2000-510565 | A | 8/2000 |
| JP | 2003-526759 | A | 9/2003 |
| JP | 2006-507463 | A | 3/2006 |
| JP | 2009-63077 | A | 3/2009 |
| JP | 2009-156447 | A | 7/2009 |
| KR | 101441690 | B1 | 9/2014 |
| WO | 2004/048784 | A2 | 6/2004 |

\* cited by examiner

UNIVERSAL TUBE STUB PLUG WITH SEAL PORT

FIELD OF THE DISCLOSURE

The Present Disclosure is Directed to Fluid Delivery Systems, and More Particularly to Extreme Flow Rate and/or High Temperature Surface Mount Fluid Delivery Systems for Use in the Semiconductor Processing and Petrochemical Industries

BACKGROUND OF THE ART

Fluid delivery systems are used in many modern industrial processes for conditioning and manipulating fluid flows to provide controlled admittance of desired substances into the processes. Practitioners have developed an entire class of fluid delivery systems which have fluid handling components removably attached to flow substrates containing fluid pathway conduits. The arrangement of such flow substrates establishes the flow sequence by which the fluid handling components provide the desired fluid conditioning and control. The interface between such flow substrates and removable fluid handling components is standardized and of few variations. Such fluid delivery system designs are often described as modular or surface mount systems. Representative applications of surface mount fluid delivery systems include gas panels used in semiconductor manufacturing equipment and sampling systems used in petrochemical refining. The many types of manufacturing equipment used to perform process steps making semiconductors are collectively referred to as tools. Embodiments of the present invention relate generally to fluid delivery systems for semiconductor processing and specifically to surface mount fluid delivery systems that are specifically well suited for use in extreme flow rate and/or high temperature applications where the process fluid is to be heated to a temperature above ambient. Aspects of the present invention are applicable to surface mount fluid delivery system designs whether of a localized nature or distributed around a semiconductor processing tool.

Industrial process fluid delivery systems have fluid pathway conduits fabricated from a material chosen according to its mechanical properties and considerations of potential chemical interaction with the fluid being delivered. Stainless steels are commonly chosen for corrosion resistance and robustness, but aluminum or brass may be suitable in some situations where cost and ease of fabrication are of greater concern. Fluid pathways may also be constructed from polymer materials in applications where possible ionic contamination of the fluid would preclude using metals. The method of sealingly joining the fluid handling components to the flow substrate fluid pathway conduits is usually standardized within a particular surface mount system design in order to minimize the number of distinct part types. Most joining methods use a deformable gasket interposed between the fluid component and the flow substrate to which it is attached. Gaskets may be simple elastomeric O-Rings or specialized metal sealing rings such as seen in U.S. Pat. Nos. 5,803,507 and 6,357,760. Providing controlled delivery of high purity fluids in semiconductor manufacturing equipment has been of concern since the beginning of the semiconductor electronics industry and the construction of fluid delivery systems using mostly metallic seals was an early development. One early example of a suitable bellows sealed valve is seen in U.S. Pat. No. 3,278,156, while the widely used VCR® fitting for joining fluid conduits is seen in U.S. Pat. No. 3,521,910, and a typical early diaphragm sealed valve is seen in U.S. Pat. No. 5,730,423 for example. The recent commercial interest in photovoltaic solar cell fabrication, which has less stringent purity requirements than needed for making the newest microprocessor devices, may bring a return to fluid delivery system using elastomeric seals.

A collection of fluid handling components assembled into a sequence intended for handling a single fluid species is frequently referred to as a gas stick. The equipment subsystem comprised of several gas sticks intended to deliver process fluid to a particular semiconductor processing chamber is often called a gas panel. During the 1990s several inventors attacked problems of gas panel maintainability and size by creating gas sticks wherein the general fluid flow path is comprised of passive metallic structures, containing the conduits through which process fluid moves, with valves and like active (and passive) fluid handling components removably attached thereto. The passive fluid flow path elements have been variously called manifolds, substrates, blocks, and the like, with some inconsistency even within the work of individual inventors. This disclosure chooses to use the terminology flow substrate or manifold to indicate fluid delivery system elements which contain passive fluid flow path(s) that may have other fluid handling devices mounted there upon.

An objective of the present disclosure is to provide a universal tube stub plug with seal port for fluid delivery substrates. Welded stubs can be prone to cracks and leaks due to external forces applied to the tube stub during installation and use.

Machining the tubes and/or tube stubs on the substrate and manifold is costly due to the large amount of material that needs to be removed in order to create the tube stub. Adding an external module bolted to the end of the substrate or manifold will increase its cost, length and complexity.

Additional information related to fluid delivery substrates can be found in U.S. Pat. No. 8,496,029 which is hereby incorporated by references as if fully set forth herein.

SUMMARY OF THE INVENTION

The present disclosure provides a solution to deficiencies in the design and implementation of flow control systems when tube stubs are welded to gas and fluid substrates.

The present disclosure enables the user to connect gas and fluid substrates and manifolds to other fluid substrates and manifolds with a stronger and cheaper connection.

DETAILED DESCRIPTION

Figure 1A:
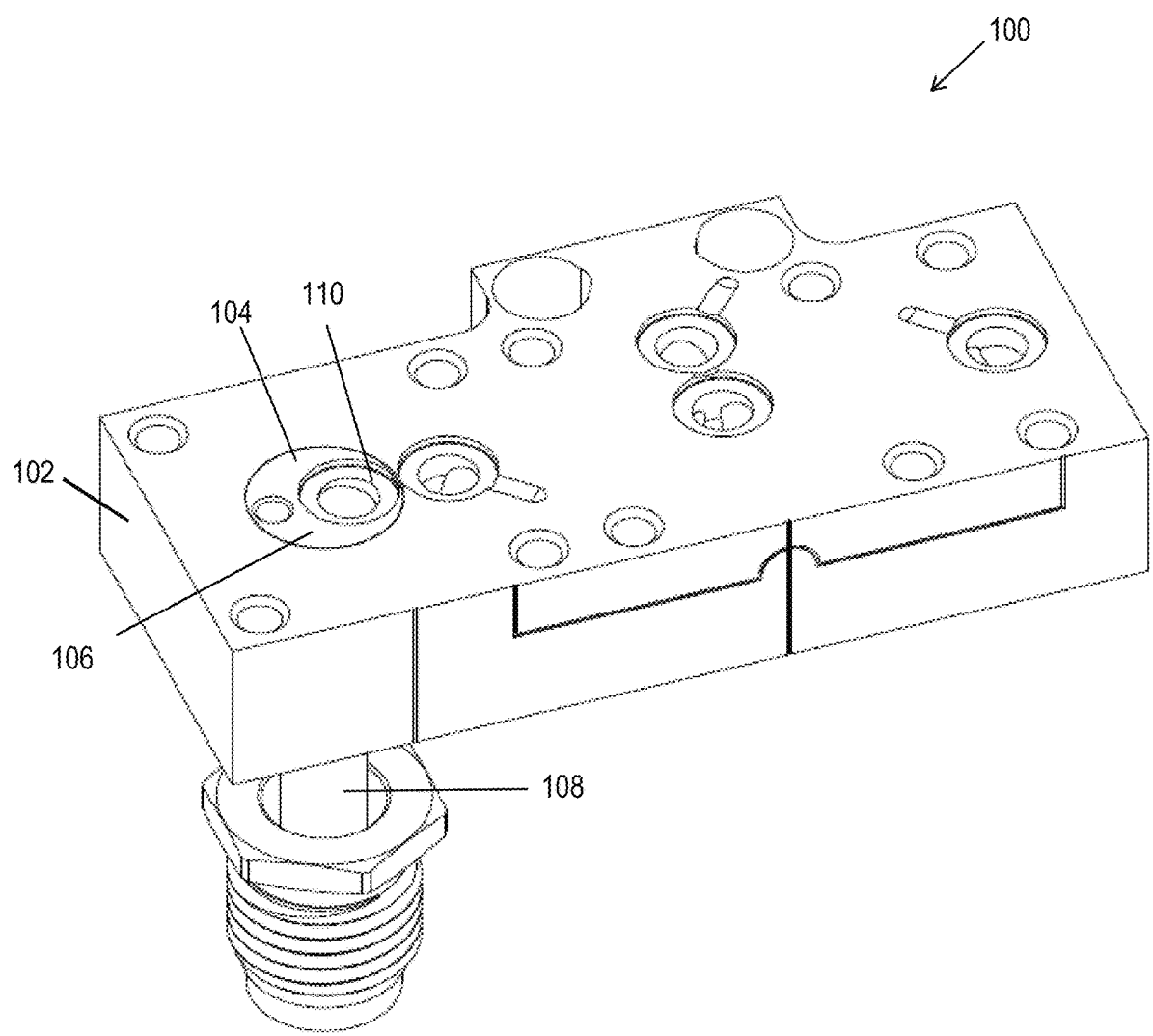
FIGS. 1A-E show an exemplary manifold with a tube stub plug and a first anti-rotation feature, consistent with embodiments of the present disclosure.
Figure 1B:
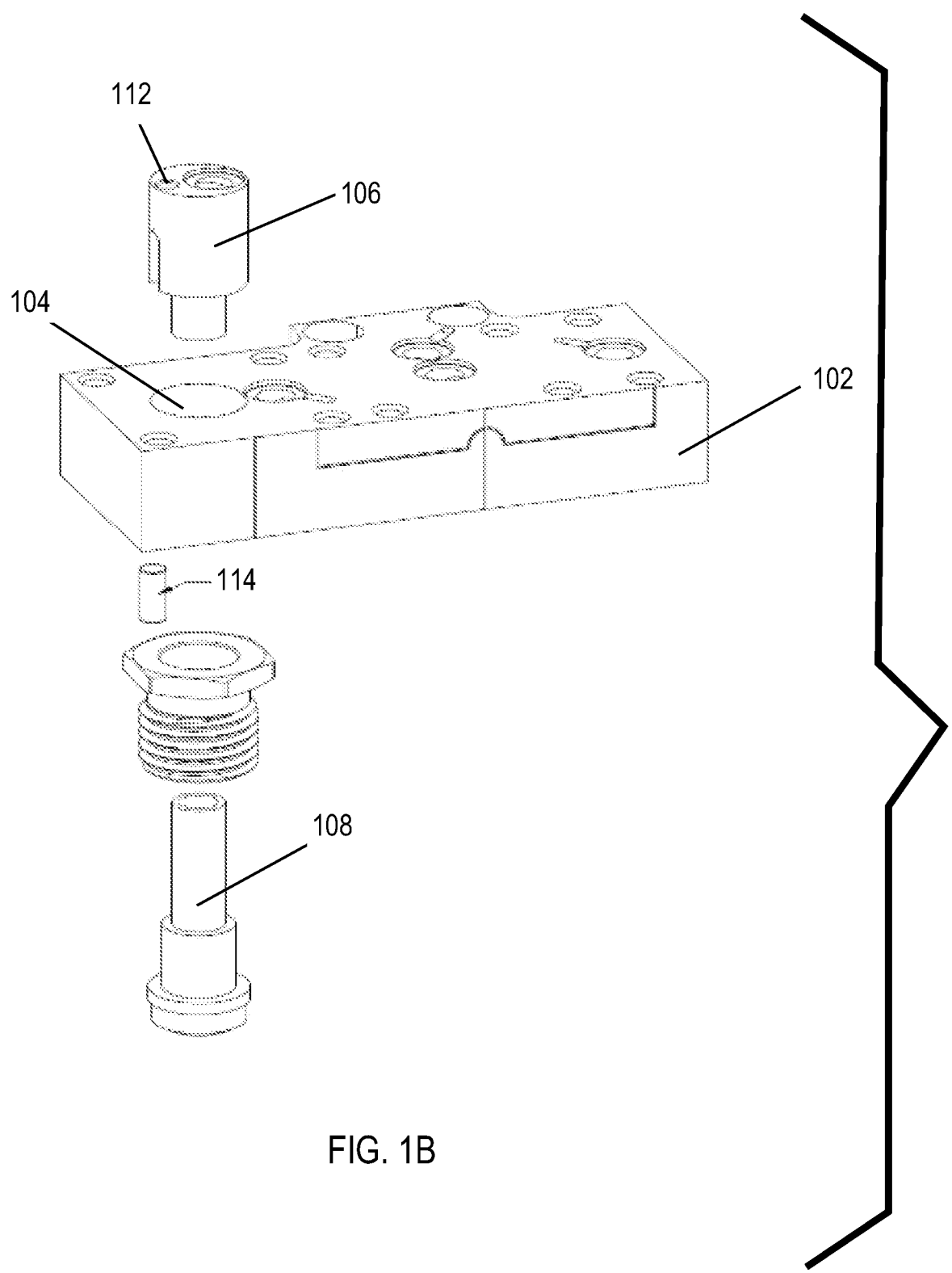
Figure 1C:
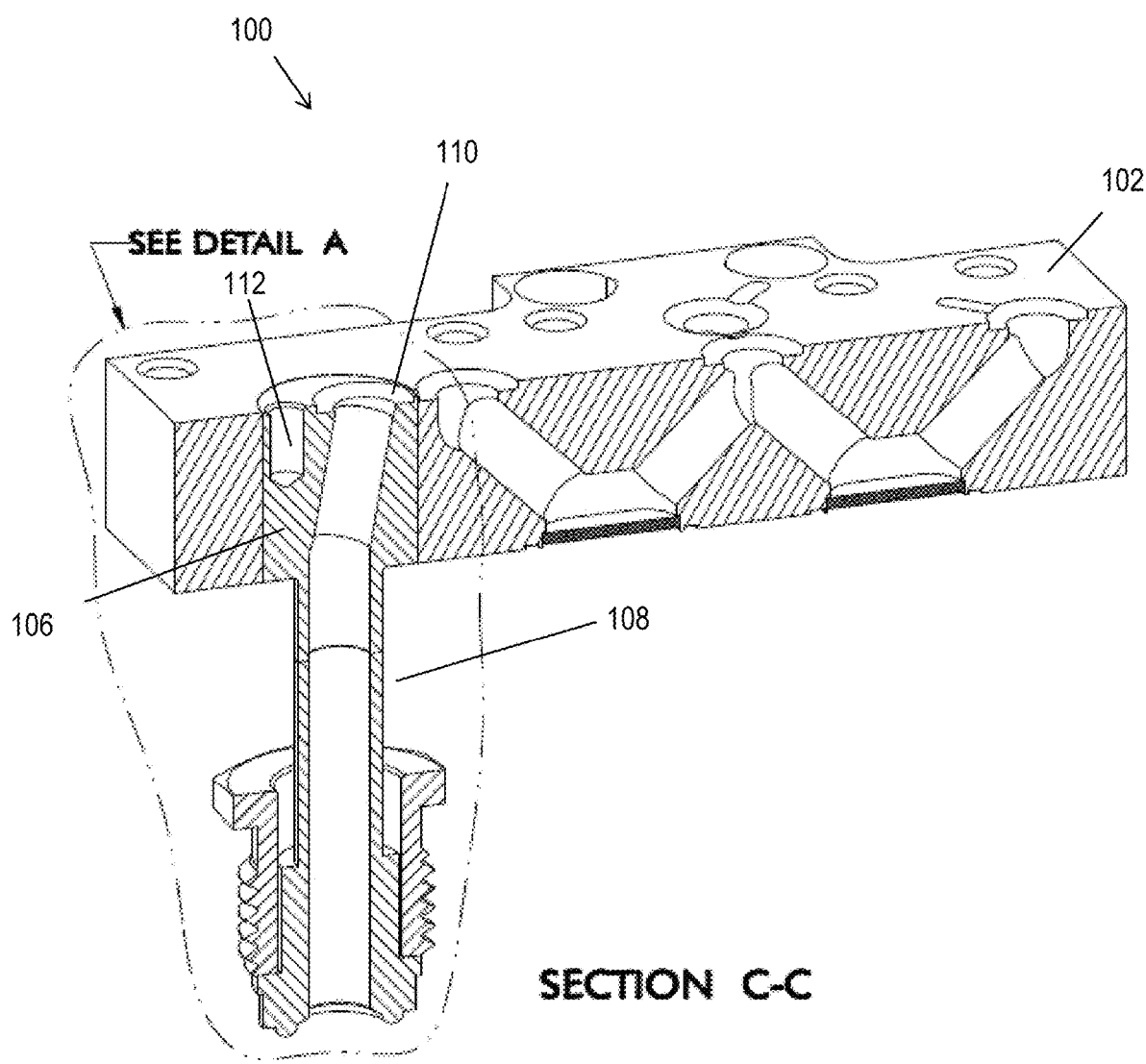
Figure 1D:
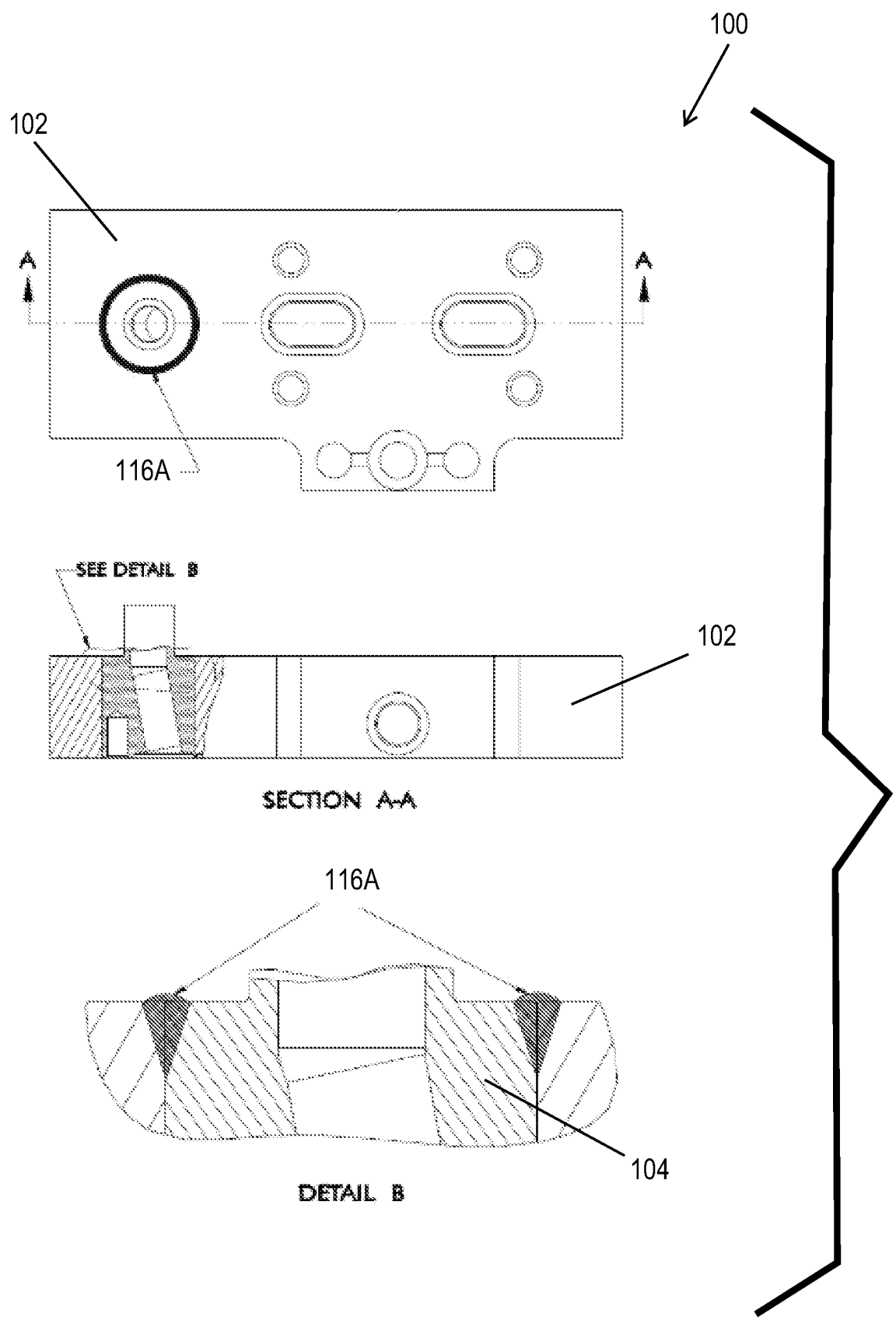
Figure 1E:
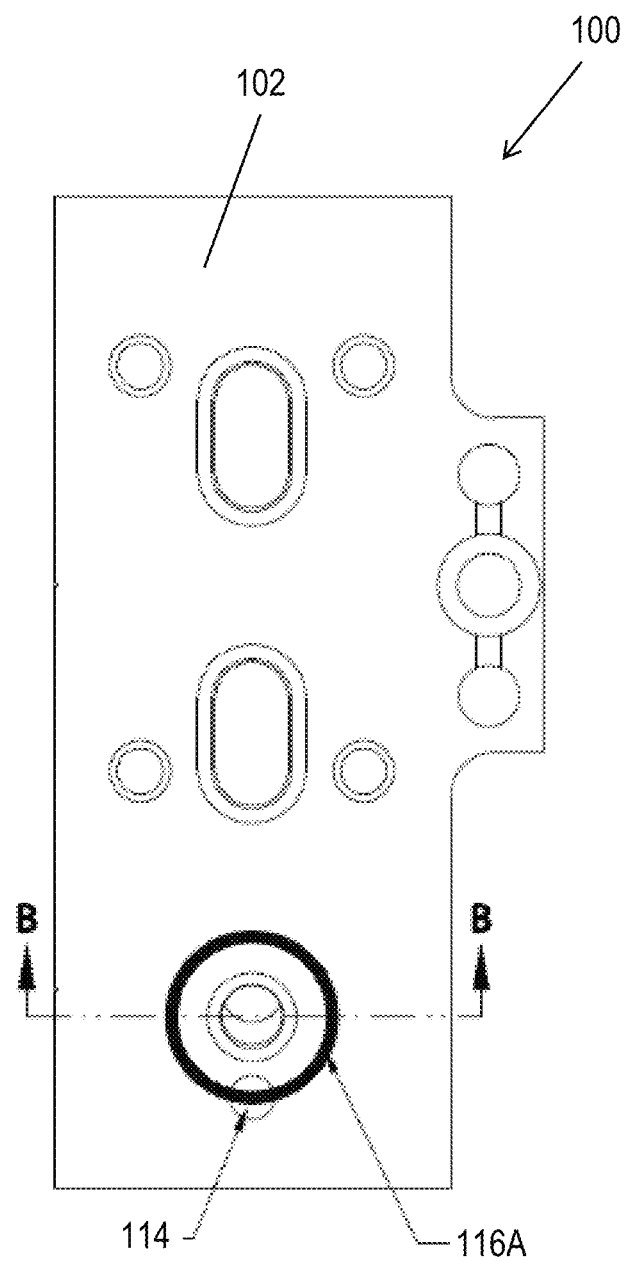

The present disclosure uses a separate plug with stub at one end and seal at the other end. An opening through the substrate or manifold can receive the tube stub plug. The tube stub will enable the port to connect other manifolds or to process and deliver gases and fluids while also providing surface mount seal on the component mounting side.

Different material and configurations of the tube stub plug and receptacle locations on the substrate and manifold can depend on configuration, application and industry which these configurations are used.

FIGS. 1A-E show an exemplary manifold and a tube stub plug assembly and a first anti-rotation feature, consistent with embodiments of the present disclosure. The first embodiment can include a manifold and tube stub plug assembly 100 with a manifold 102 with a tube stub plug hole 104 and a round tube stub plug 106 with tube stub 108 on the one end and seal surface 110 on other end. The tube stub plug hole 104 can be machined through the manifold 102 (see FIG. 1B). It should be noted that this arrangement can also be applied to holes/tube stubs in substrates (e.g., the term "substrate" can be substituted for "manifold" for anything described herein) that can be connected to the manifold 102 (not shown in FIGS. 1A-E).

An anti-rotation retainer threaded opening 112 can be machined on the top of the tube stub plug 106 to keep the position of the seal surface 110 of a seal port (as part of the manifold 102) to other seal ports (not shown in FIGS. 1A-B) on a manifold while also keeping the alignment to top surface. An anti-rotation pin 114 (see FIG. 1E) can be inserted into the anti-rotation retainer threaded opening 112

A positioning plate (not shown in FIGS. 1A-E) can be mounted to a seal side of a manifold (e.g., manifold 102) to secure the planarity and orientation (i.e., angle) of the tube stub plug (e.g., tube stub plug 106) to the other seal surfaces (i.e., the seal surface 110 and a corresponding seal surface on a substrate (not shown)). During construction, a fastener can be inserted through a hole in the positioning plate into a corresponding hole on the manifold to keep the tube stub plug against a fixture plate while also keeping the angular alignment of the tube stub plug and other seals (not shown) in a desired location and/or orientation while the tube stub plug is fixed to the manifold (e.g., welded, or secured in some other fashion).

The manifold (e.g., manifold 102) and the tube stub plug (e.g., tube stub plug 106) of the assembly 100 with tube stub plug exposed toward the welding process can be positioned for adding a weld 116A to add additional strength, and to further lock in the location and orientation of the tube stub plug, and seal the joint between the tube stub plug and the manifold (or a substrate (not shown)). The weld can either be a continuous weld (see, e.g., weld 116A in FIGS. 1D-E; weld 216A in FIG. 2E) around the entire interface of the manifold and the tube stub plug (at the surface of the manifold) or one or more tack welds (see, e.g., welds 216B in FIGS. 2A-D and 2F) at various locations at the interface.

After welding of the tube stub plug, the alignment fixture from the other side of the manifold (or substrate) can be removed. The weld process can include, for example, Ebeam, laser, manual welding and other standard industry used welding processes appropriate for the application. Benefits of this embodiment include increased strength of the tube by using the whole body of substrate and manifold to support the tube and/or the tube-substrate joint as pressure is applied to the tube (e.g., as forces are applied to a portion of the tube). This embodiment can also result in a lower cost than a separately mounted body to the end of the substrate or manifold.

FIGS. 2A-F show an exemplary manifold and a tube stub plug assembly and a second anti-rotation feature, consistent with embodiments of the present disclosure. The second embodiment can include a manifold and tube stub plug assembly 200 with a manifold 202 with a tube stub plug hole 204 and a round tube stub plug 206 with tube stub 208 on the one end and seal surface 210 on other end. The tube stub plug hole 204 can be machined through the manifold 202. Similar to embodiment 1, an anti-rotation hole 212 can be drilled through the tube stub plug body to keep the position of the seal port to other seal ports on the substrate and manifold. A fixture (not shown in FIGS. 2A-F) can be used to keep the seal surface aligned to the other seal surface on the substrate and manifold. It should be noted that this arrangement can also be applied to holes/tube stubs in substrates (e.g., the term "substrate" can be substituted for "manifold" for anything described herein) that can be connected to the manifold 202 (not shown in FIGS. 2A-F). In this embodiment, one or more countersunk holes 218 can be drilled (in FIG. 2A there are two) on the top of the tube stub plug 206 and the manifold 202. The tube stub plug 206 can further be held in place by, for example, a tack weld 216 of the joint between the tube stub plug 206 and the substrate or manifold 202 inside of the countersunk holes 218. The countersunk holes 218 can ensure that the weld beads of the weld 216 are not above a surface of the substrate or manifold 202 surface to prevent interference with mounting of components to the substrate surface of the manifold 202. A fixture (i.e., a positioning plate; tacking fixture; not shown in FIGS. 2A-F) can be mounted to a seal side of the substrate and manifold (e.g., manifold 202) to secure the planarity and angle of the tube stub plug (e.g., the tube stub plug 206) to the other seal surfaces during assembly. A weld process can be used to further secure the tube stub plug with the substrate. The weld can either be a continuous weld (see, e.g., weld 216A in FIG. 2E) around the entire interface of the manifold and the tube stub plug (at the surface of the manifold) or one or more tack welds (see, e.g., welds 216B in FIGS. 2A-D and 2F) at various locations at the interface. The weld process can include, for example, Ebeam, laser, manual welding and other standard industry used welding processes appropriate for the application of the substrate and manifold.

Figure 2A:
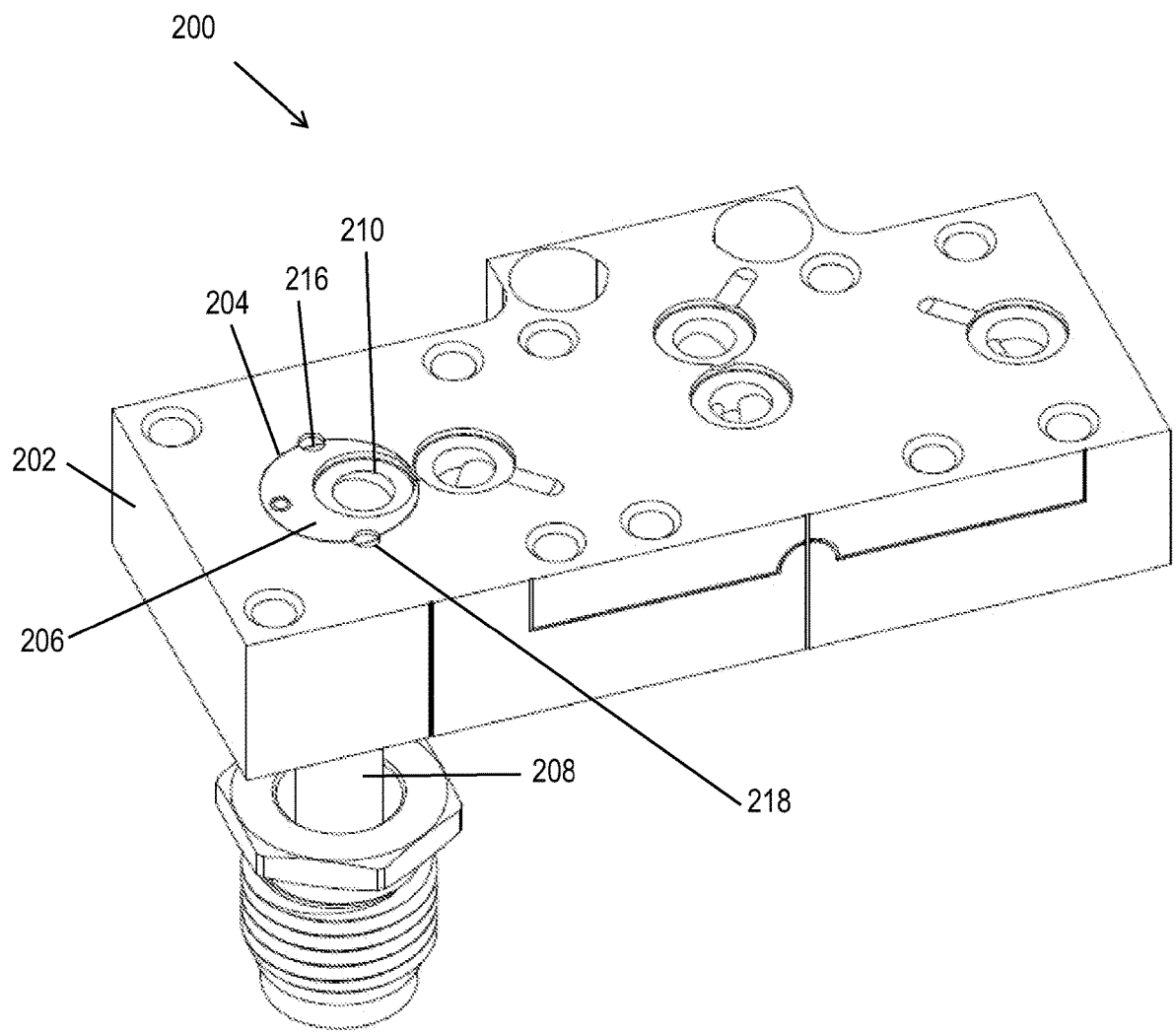
FIGS. 2A-F show an exemplary manifold with a tube stub plug and a second anti-rotation feature, consistent with embodiments of the present disclosure.
Figure 2B:
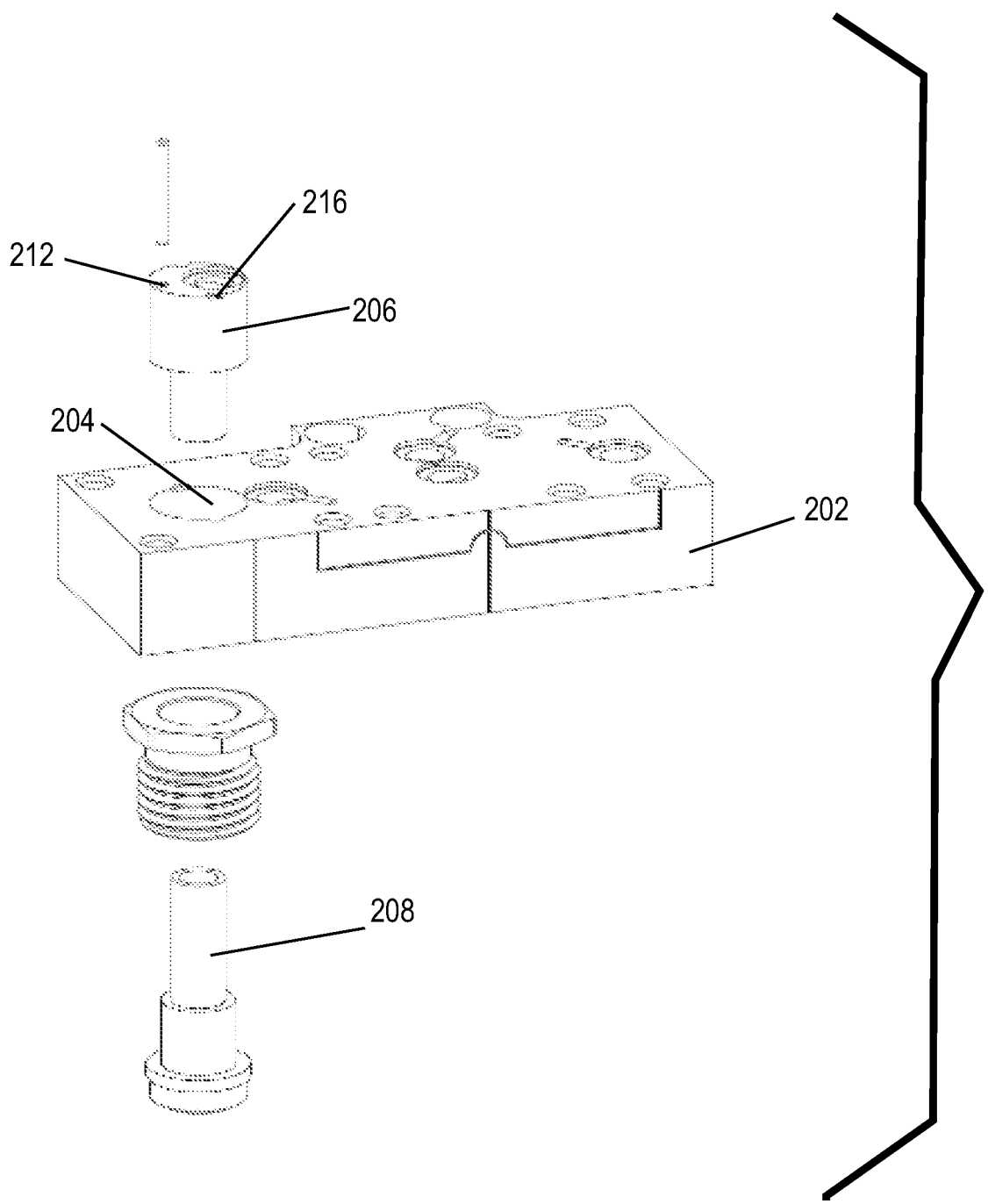
Figure 2C:
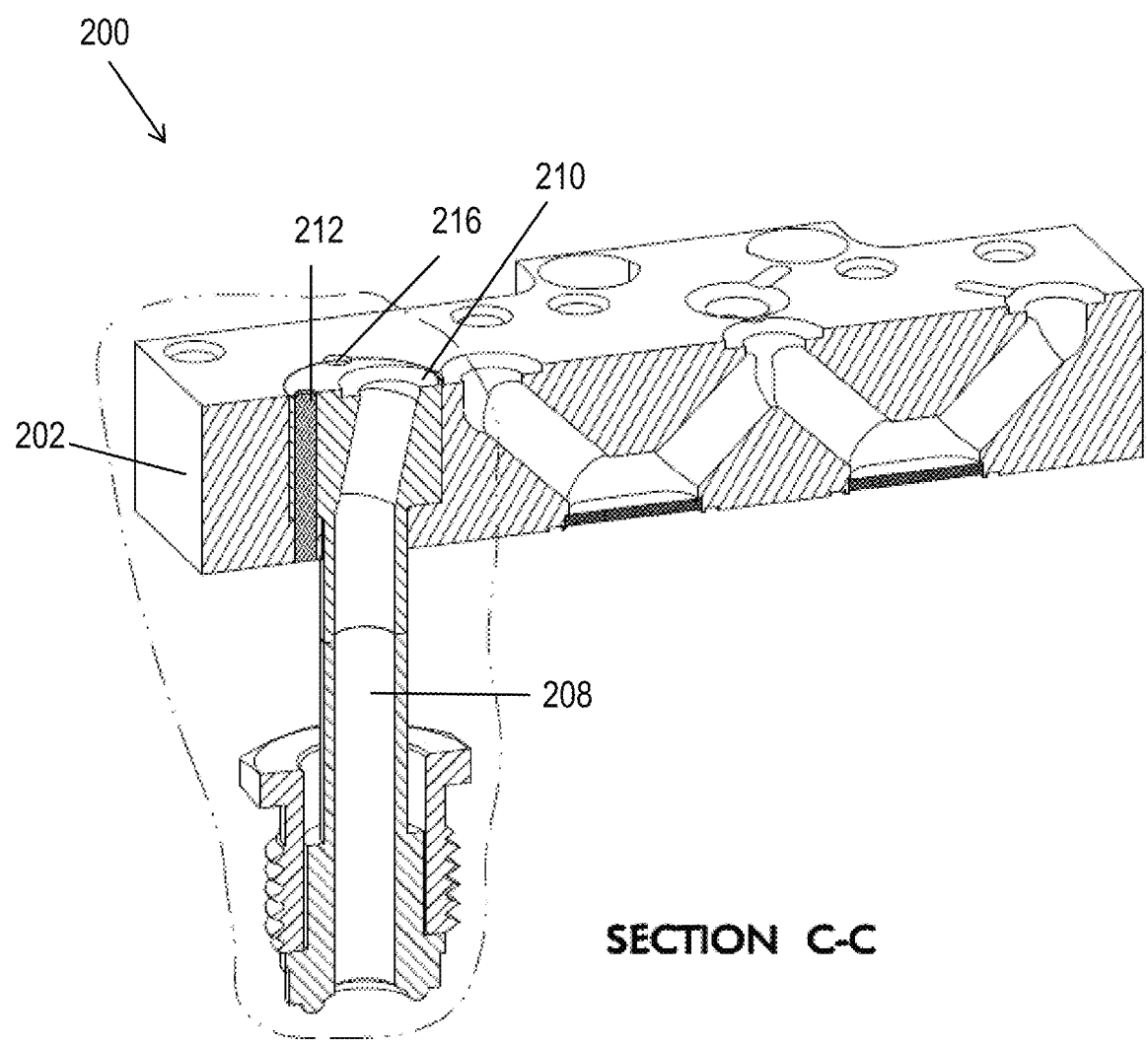
Figure 2D:
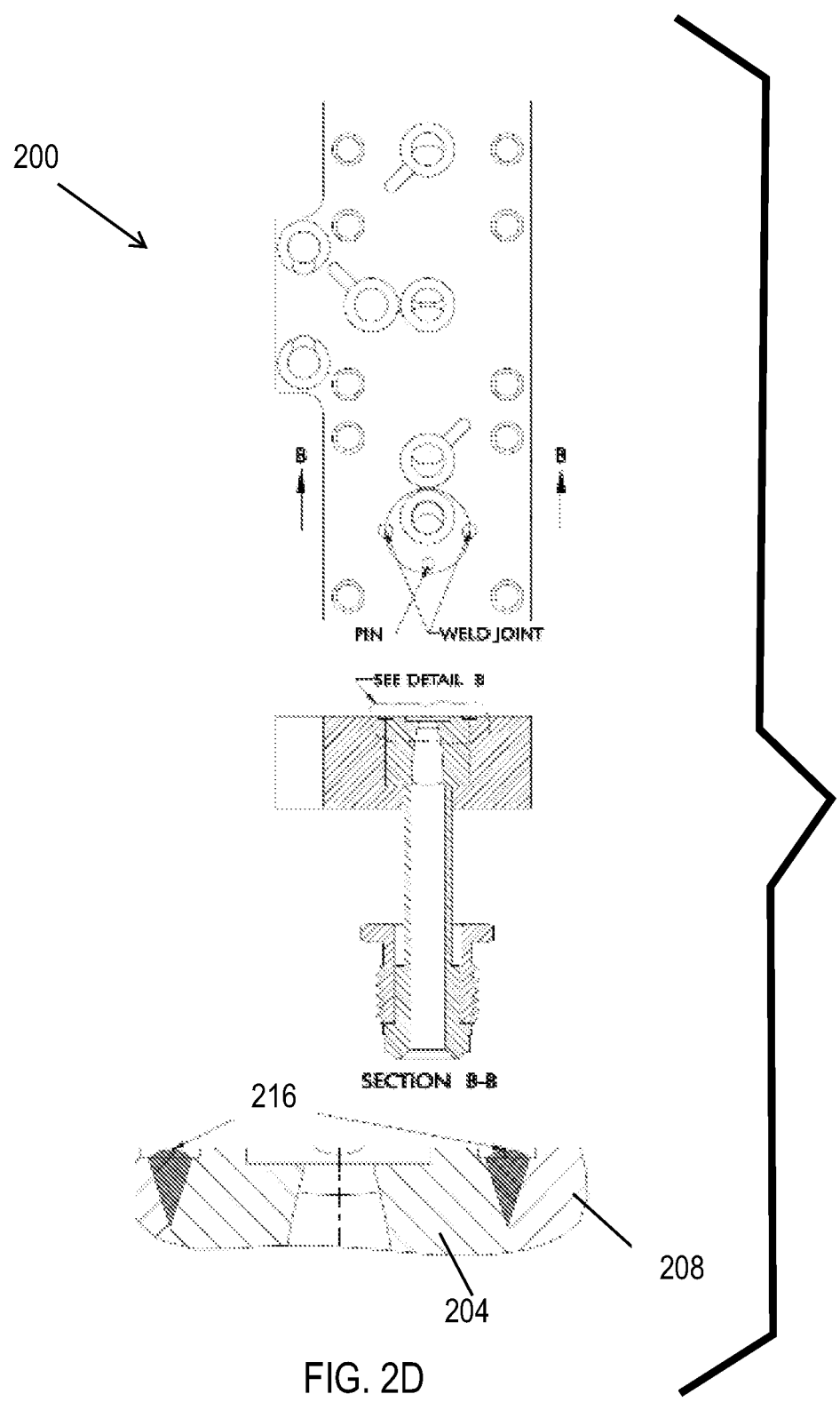
Figure 2E:
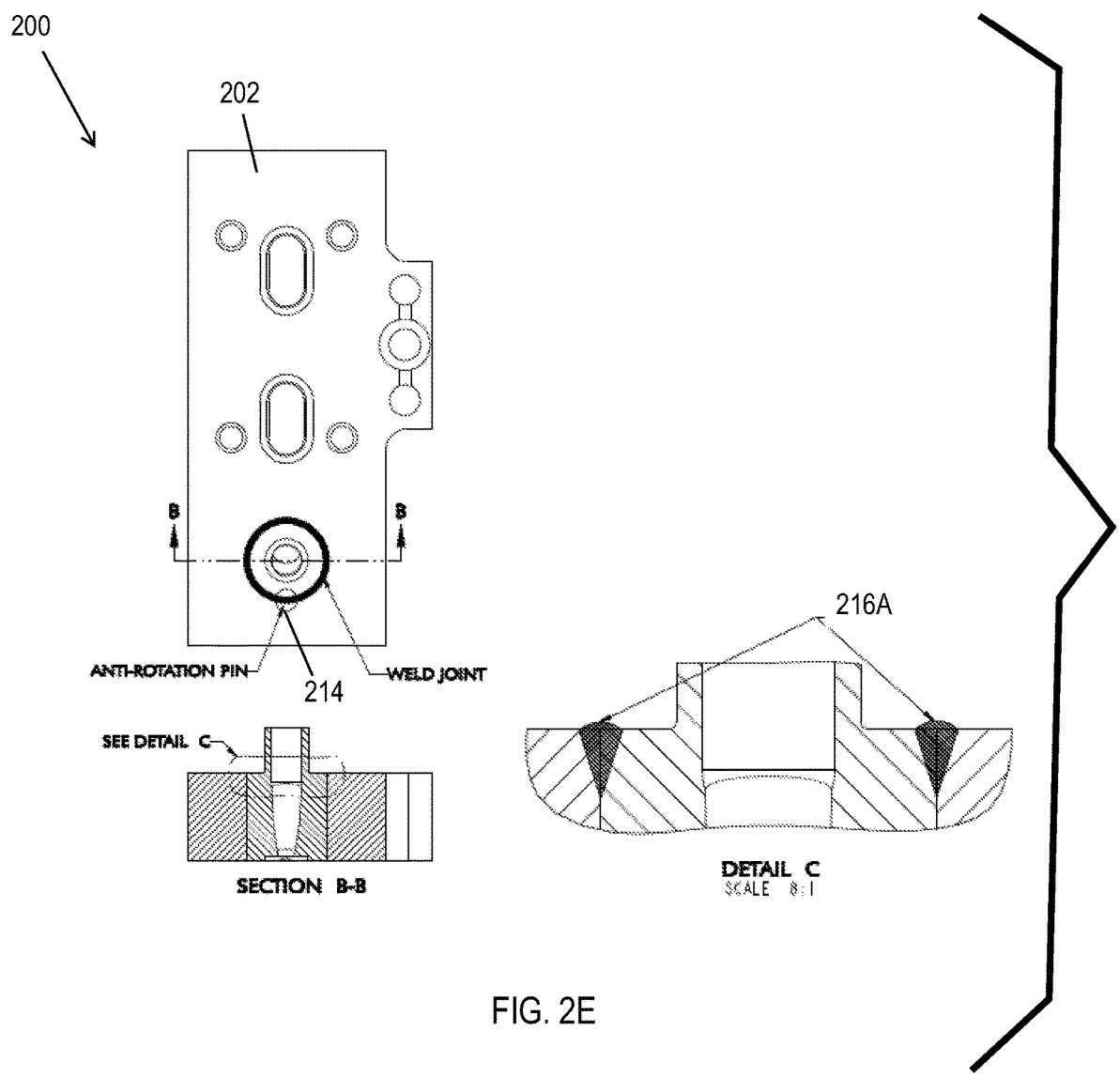

FIG. 2E shows another version of the second embodiment of a tube stub plug coupled with the substrate. This embodiment can have an anti-rotation pin 214 as shown in FIG. 2E and the tube stub plug 206 can be welded to the manifold (e.g., a continuous weld joint 216A shown in FIG. 2E).

Figure 2F:
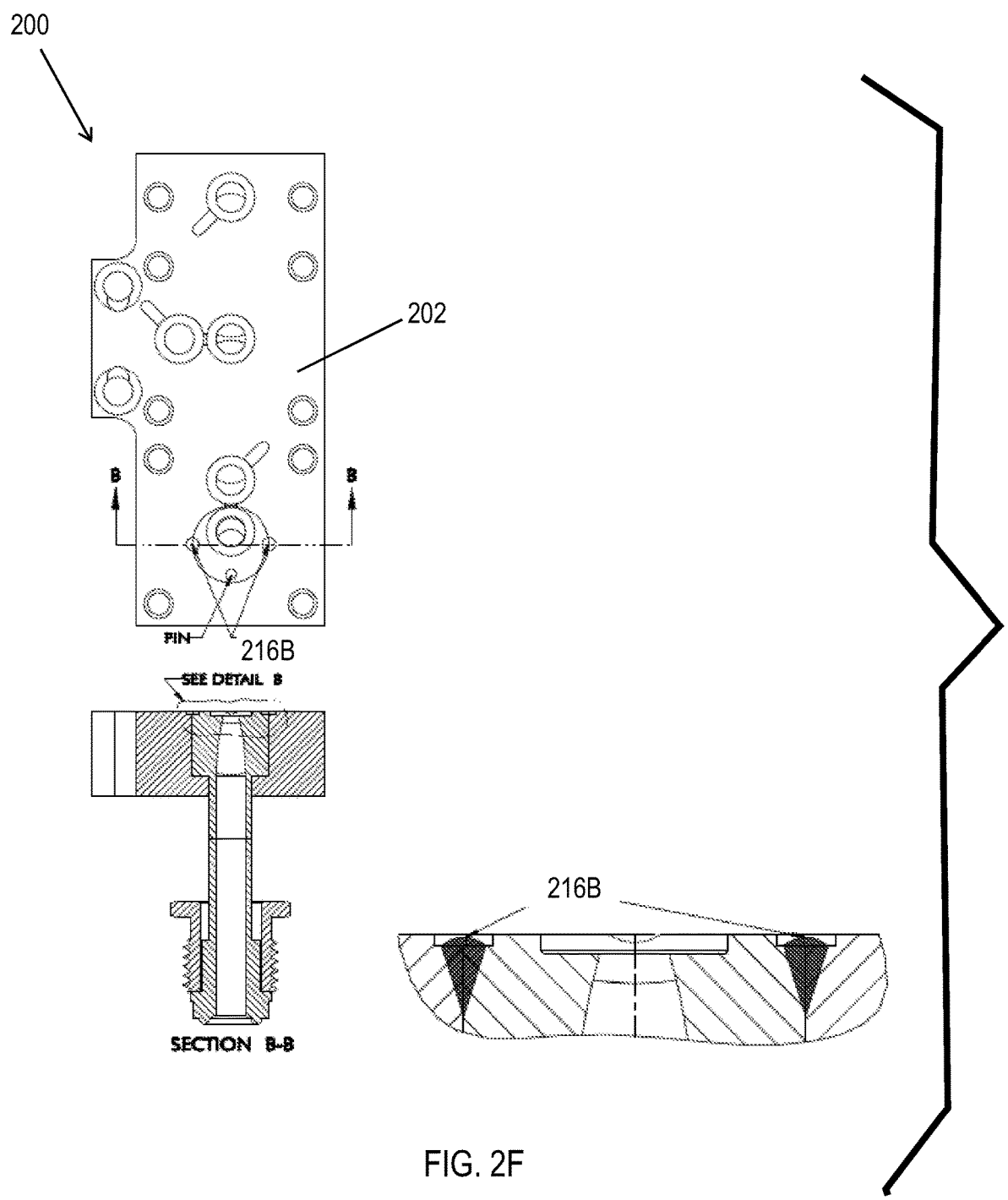

Another variation of the second embodiment, shown in FIG. 2F, can include the manifold and tube stub plug assembly 200 with the manifold 202 and the tube stub plug 206. The manifold 200 can include the anti-rotation pin 214 to prevent rotation and two tack welds 216B between the tube stub plug and the manifold. Other numbers of tack welds are possible (1, 3, 4, 5, 6, 7, etc.) depending on, for example, the size of the welds and the location of the welds. The manifold and the tube stub portion adjacent the manifold can each have a tack weld recessed portion that allows for the addition of the tack weld without adding material above the surface of the manifold (e.g., the seal surface side of the manifold). In other embodiments (not shown), the tack weld can be made without a tack weld recessed portion, allowing the tack weld to protrude above the manifold surface and the tube stub portion surface.

After tack welding of the tube stub plug at the countersunk holes 218, the assembly 200 can removed from the tacking fixture (not shown in FIGS. 2A-D). Benefits of this embodiment can include increased strength for the tube stub by using the whole body of substrate and manifold as pressure (e.g., force) is applied to the tube; use of a tack weld reduces the requirement to for a more complicated final weld fixture; and lower cost than a separately mounted body to the end of the substrate or manifold.

Figure 3A:
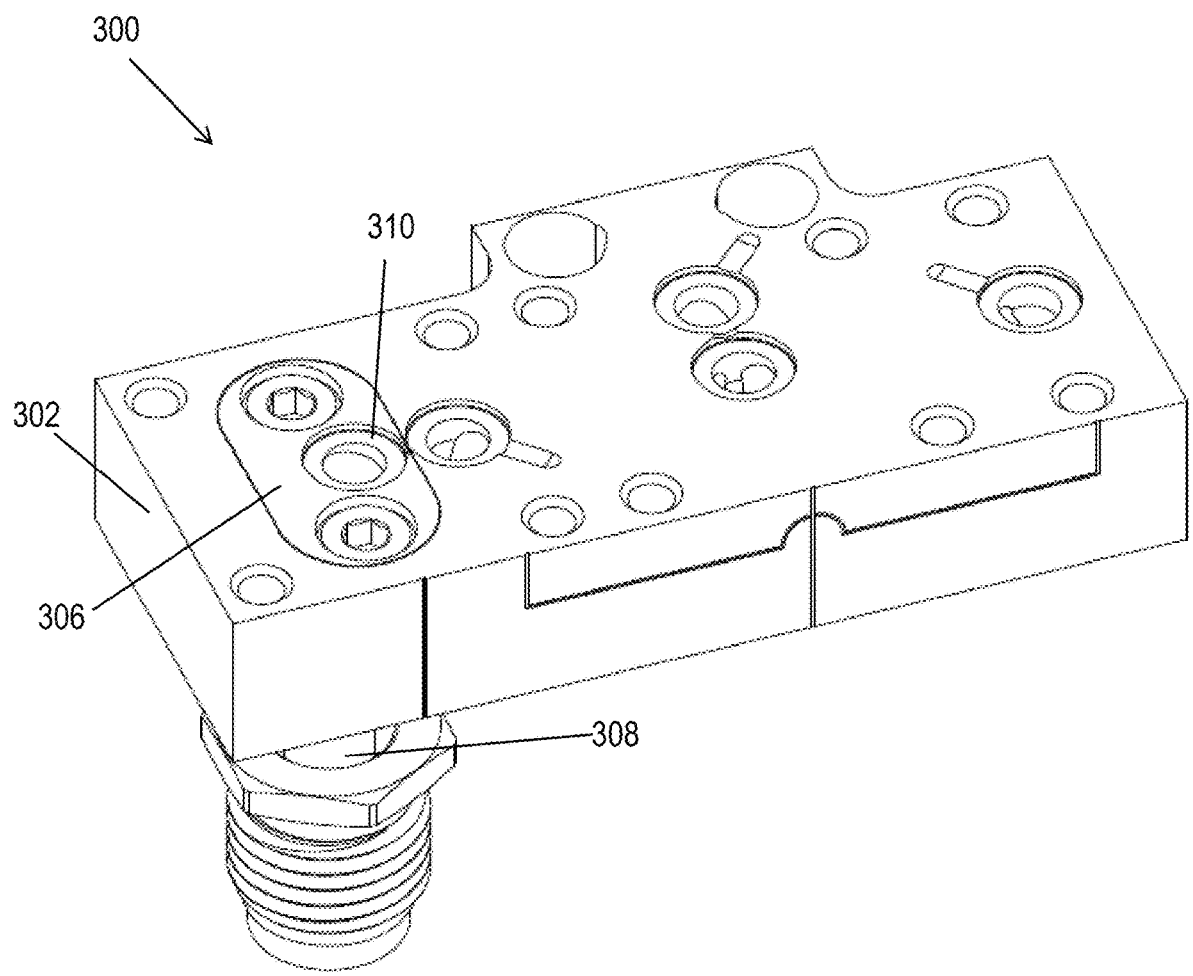
FIGS. 3A-C show an exemplary manifold with a tube stub plug and a third anti-rotation feature, consistent with embodiments of the present disclosure.
Figure 3B:
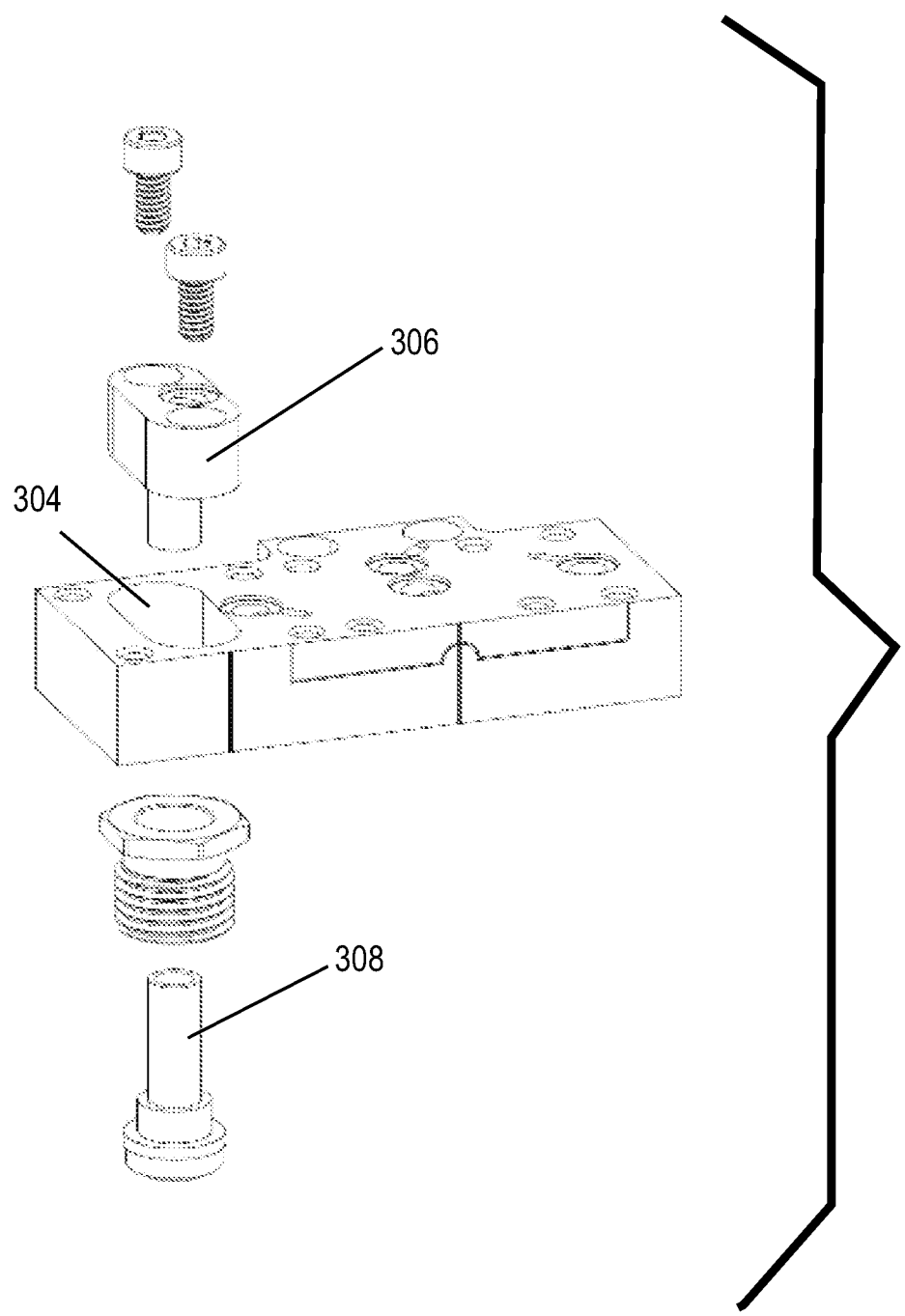
Figure 3C:
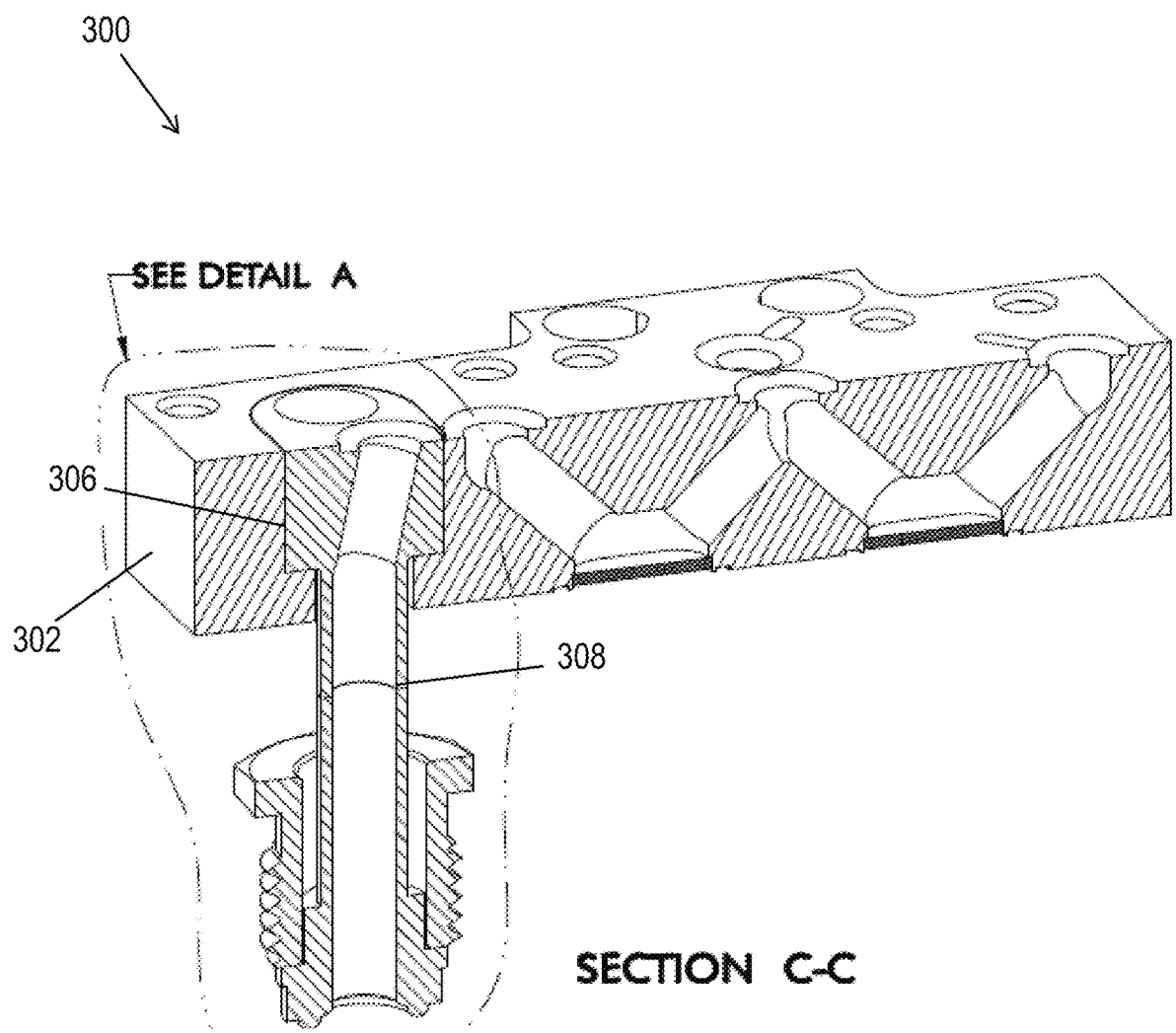

FIGS. 3A-B show an exemplary manifold with a tube stub plug and a third anti-rotation feature, consistent with embodiments of the present disclosure. The third embodiment can include a manifold and tube stub plug assembly 300 with a manifold 302 including a tube stub plug opening 304 and tube stub plug 306 with a tube stub 308 on the one end and a seal surface 310 on the other end. The shape of the tube stub plug 306 can any suitable shape including, for example, oval, triangular, square, rectangular, or hexagonal with or without rounded corners. The shape of the tube stub plug 306 can be determined on a given application, including, for example, space considerations. It should be noted that this arrangement can also be applied to holes/tube stubs in substrates (e.g., the term "substrate" can be substituted for "manifold" for anything described herein) that can be connected to the manifold 302 (not shown in FIGS. 3A-C). The tube stub plug 306 can have at least one fastener hole. FIGS. 3B-C show an example with two fastener holes) to allow the tube stub plug 306 to be secured into the substrate or manifold body by a fastener.

An opening 304 for tube stub plug 306 can be machined through the manifold 302 to enable it to receive the tube stub plug 306 configuration with at least one threaded hole to secure two parts to each other (e.g., the tub stub plug 306 to the manifold 302). In some applications and bolting configuration, no welding is required to secure the tube stub plug 306 with the manifold 302. When needed/desired, a weld process as described herein (e.g., tack weld or continuous weld) can be used to further secure the tube stub plug 306 with the manifold 302. The weld process can include, for example, Ebeam, laser, manual welding and other standard industry used welding processes appropriate for the application of the substrate and manifold.

Benefits of this embodiment can include that the body of the tube stub plug is used as a rotational alignment aid to other seals on the substrate or manifold; design that do not require welding; configurations and shapes of the tube stub plug can be changed to accommodate space available on the substrate or manifold; no welding or alignment fixture is needed for the instances where welding is needed/desired to secure the tube stub plug; the tube stub plug can more easily be replaced/changed to accommodate different tube lengths, and lower cost than a separately mounted body to the end of the substrate or manifold.

Figure 4A:
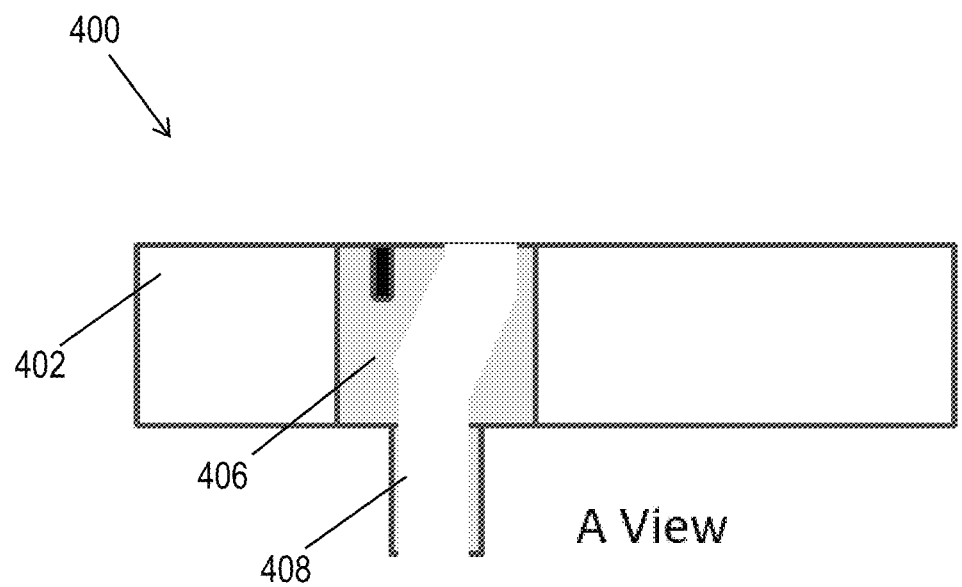
FIGS. 4A-B show a portion of an exemplary manifold with a tube stub plug that is not circular in shape, consistent with embodiments of the present disclosure.
Figure 4B:
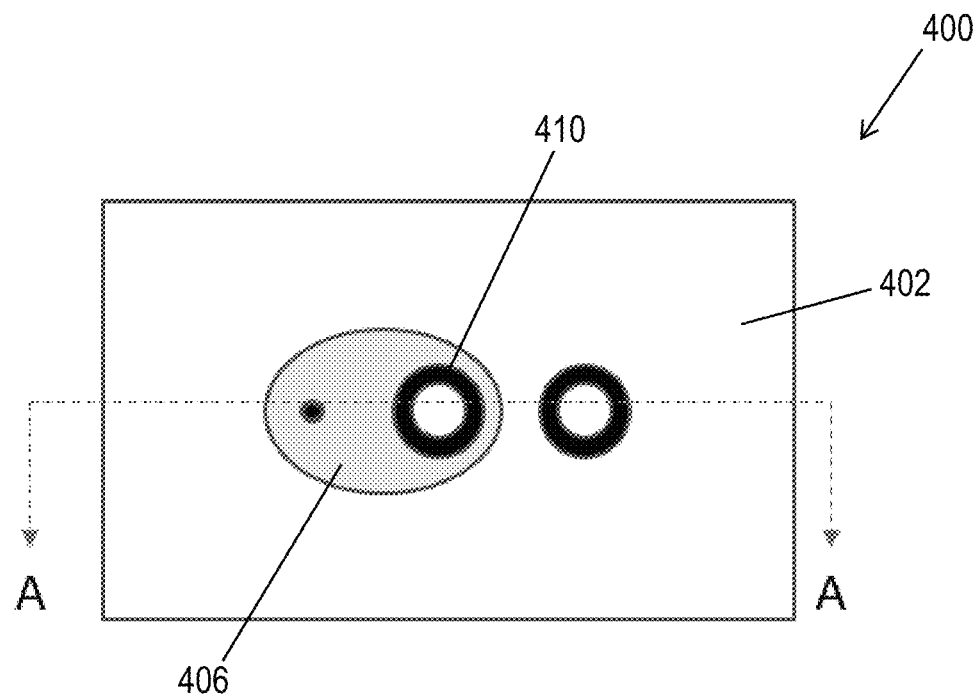

FIGS. 4A-B show a portion of an exemplary manifold with a tube stub plug that is not circular in shape, consistent with embodiments of the present disclosure. The fourth embodiment can include a manifold and tube stub plug assembly 400 with a manifold 402 including a tube stub plug opening 404 and an oval tube stub plug 406 with tube stub 408 on the one end and a seal surface 410 on the other end. The shape of the tube stub plug 406 can be any suitable shape including, for example, oval, triangular, square, rectangular, or hexagonal with or without rounded corners. The shape of the tube stub plug 406 can be determined on a given application, including, for example, space considerations. It should be noted that this arrangement can also be applied to holes/tube stubs in substrates (e.g., the term "substrate" can be substituted for "manifold" for anything described herein) that can be connected to the manifold 402 (not shown in FIGS. 4A-B). An opening for tube stub plug 406 can be machined through the manifold to enable it to receive the tube stub plug 406 with at least one threaded hole to secure two parts to each other (e.g., the tub stub plug 406 to the manifold 402). A threaded hole can be machined on the seal side of the tube stub plug 406 body to keep a surface position of the seal port 410 to other seal ports on the manifold 402. A fixture can used to keep the seal surface 410 aligned to the other seal surfaces on the manifold (e.g., to maintain planarity between the tube stub plug 406 and the manifold surface, to maintain a specific orientation of the tube stub plug 406, etc.). When needed/desired, a weld process as described herein (e.g., tack weld or continuous weld) can be used to further secure the tube stub plug 406 with the manifold 402. The weld process can include, for example, Ebeam, laser, manual welding and other standard industry used welding processes appropriate for the application of the substrate and manifold.

Benefits of this embodiment can include that the body of the tube stub plug is used as a rotational alignment aid to other seals on the substrate or manifold; the configuration and shape of the tube stub plug can be changed to accommodate space considerations on the substrate and/or manifold.

Figure 5A:
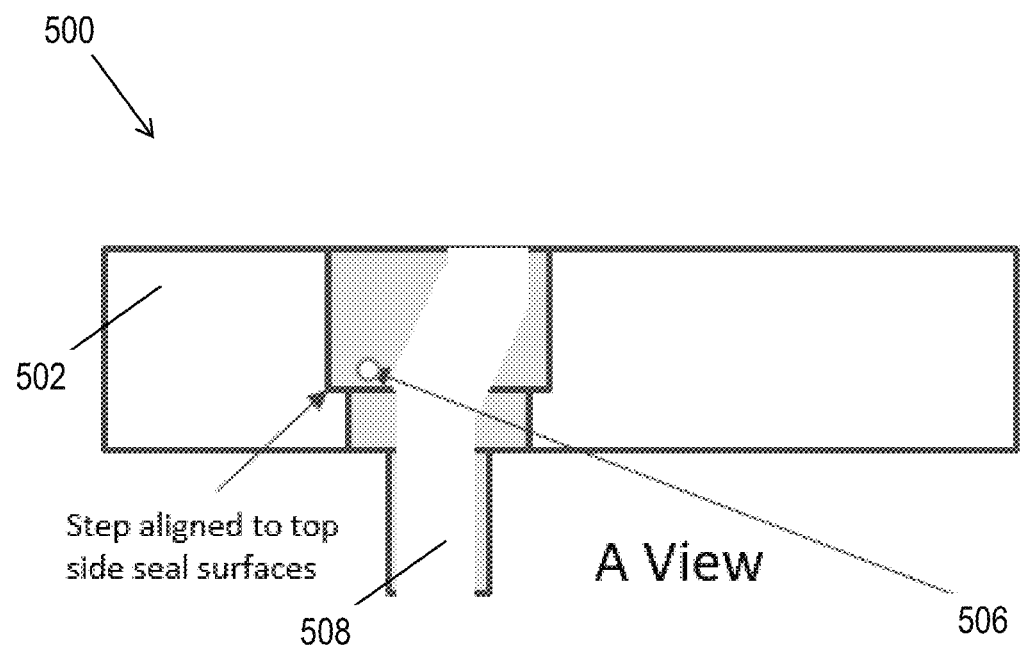
FIGS. 5A-B show an exemplary manifold with a tube stub plug with a stepped portion proximate the tube stub side of the manifold, consistent with embodiments of the present disclosure.
Figure 5B:
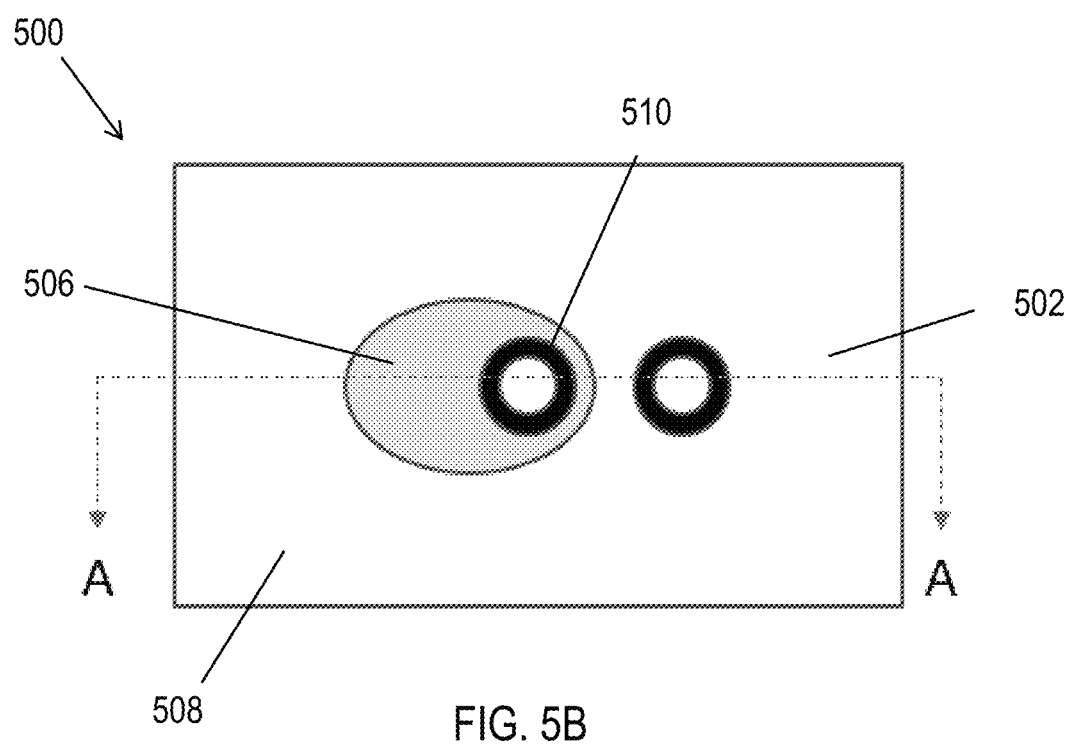

FIGS. 5A-B show an exemplary manifold with a tube stub plug with a stepped portion for alignment of a seal surface on the tube stub plug and the manifold, consistent with embodiments of the present disclosure. The fifth embodiment can include a manifold and tube stub plug assembly 500 with a manifold 502 including a tube stub plug opening 504 and a round or oval tube stub plug 506 with tube stub 508 on the one end and seal surface 510 on other with a stepped portion on the tube side of the tube stub plug 506 (e.g., further from the surface of the manifold 502 proximate the seal surface 510). This configuration of the tube stub plug 506 requires insertion of the tube stub plug 506 from the top (i.e., the seal surface 510 side) of the manifold 502. The shape of the tube stub plug can be any suitable shape including, for example, oval, triangular, square, rectangular, or hexagonal with or without rounded corners. The shape of the tube stub plug 506 can be determined on a given application, including, for example, space considerations. A round tube stub plug (not shown in FIGS. 5A-B; see, e.g., FIGS. 1A-E) can be used provided that it includes an anti-rotation feature (e.g., an anti-rotation pin, tack weld(s), continuous weld, etc.) to align the angle/position of the seal port to other ports on manifold. It should be noted that this arrangement can also be applied to holes/tube stubs in substrates (e.g., the term "substrate" can be substituted for "manifold" for anything described herein) that can be connected to the manifold 502 (not shown in FIGS. 5A-B).

The opening 504 for tube stub plug 506 can be machined through the manifold, and the tube stub plug 506 can include a stepped portion 520 (i.e. shelf; step, etc.) at the bottom (tube stub 508) side of the tube stub plug 506. The opening 504 can also include a step corresponding to that on the tube stub plug 506. The step 520 can be any suitable configuration (e.g., a right angle as shown in FIG. 5A) to align a top surface of the tube stub plug with a surface of the substrate. Other examples include an angled surface (e.g., a wedge shape). The step 520 can be a portion of the tube stub plug 506 (e.g., ¼ or ½ of the tube stub plug 506, etc.) or the step 520 can go all the way around the circumference of the tube stub plug 506. A fixture can be used to keep the tube stub plug 506 in the manifold during welding of the tube stub plug to the manifold. The weld process can include, for example, Ebeam, laser, manual welding and other standard industry used welding processes appropriate for the application of the substrate and manifold.

Benefits of this embodiment can include that the body of the tube stub plug is used as a rotational alignment aid to other seals on the substrate or manifold; the weld fixture needed is simple; the configuration and shape of the tube stub plug can be changed to accommodate space considerations on the substrate and/or manifold; lower cost than a separately mounted body to the end of the substrate or manifold.

Figure 6A:
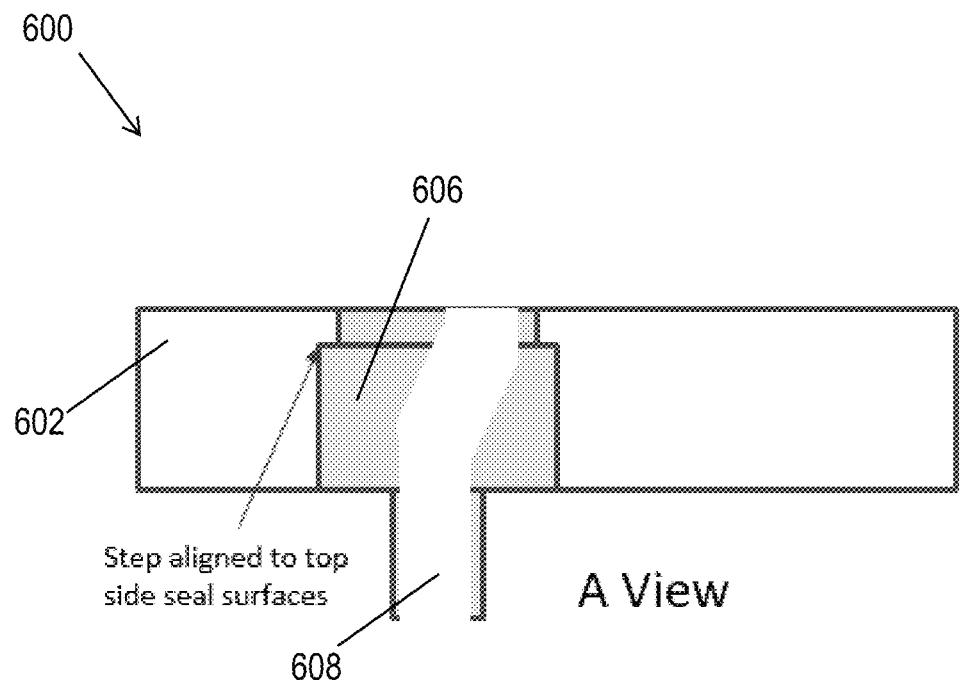
FIGS. 6A-B show an exemplary manifold with a tube stub plug with a stepped portion proximate the seal surface side of the manifold, consistent with embodiments of the present disclosure.
Figure 6B:
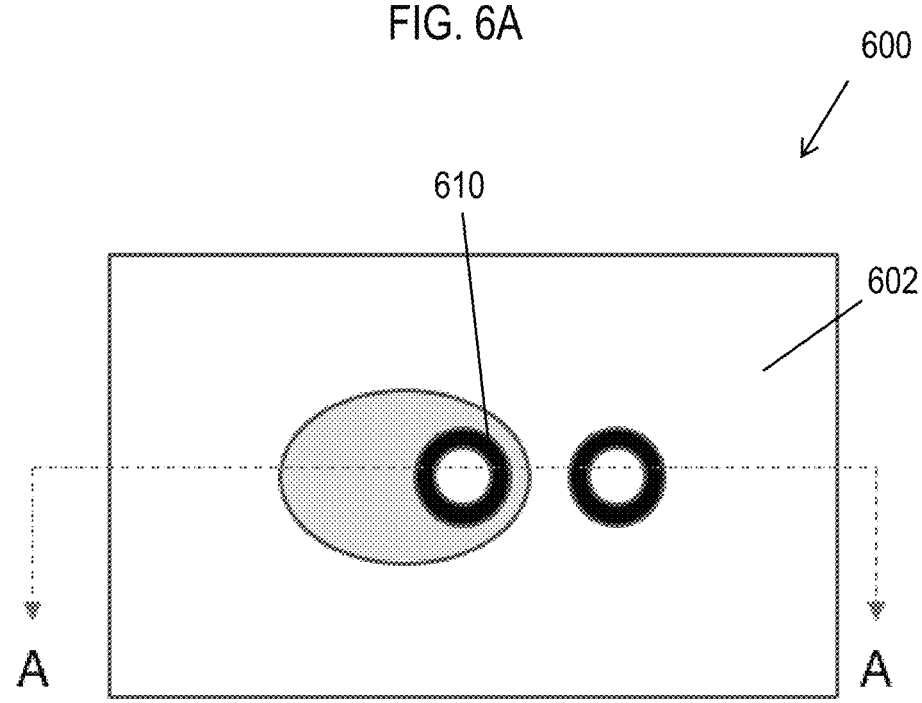

FIGS. 6A-B show an exemplary manifold with a tube stub plug with a stepped portion proximate the seal surface side of the manifold, consistent with embodiments of the present disclosure. The sixth embodiment can include a manifold and tube stub plug assembly 600 with a manifold 602 including a tube stub plug opening 604 and a round or oval tube stub plug 606 with tube stub on the one end and seal surface on other with step on the tube side of the tube stub plug. The shape of the tube stub plug can any suitable shape including, for example, oval, triangular, square, rectangular, or hexagonal with or without rounded corners. The shape of the stub can be determined on a given application, including, for example, space considerations. A round tube stub plug can be used provided that it an anti-rotation feature (e.g., an anti-rotation pin, etc.) to align the angle of the seal port to other ports on the substrate or manifold. It should be noted that this arrangement can also be applied to holes/tube stubs in substrates (e.g., the term "substrate" can be substituted for "manifold" for anything described herein) that can be connected to the manifold 602 (not shown in FIGS. 6A-B).

Then opening 604 for tube stub plug can be machined through the substrate and manifold with step (i.e., a step; a shelf; a stepped portion) at the top (seal surface 610) side of the tube stub plug 606. The tube stub 604 can have a corresponding step that matches the profile of the step in the opening 604, which allows for alignment of the tube stub plug 606 for both depth (e.g., aligning seal surfaces) and rotational alignment (in the case of round tube stub plugs (see, e.g., FIGS. 1A-E). Because the tube stub plug 606 is inserted into manifold 602 from the bottom (i.e., the side further from the seal surface 610 sides), there is no need for fixturing the tube stub plug 606 to the manifold during welding, as the step aligns the seal surface 610 with other seal surfaces on the manifold. The weld process can include, for example, Ebeam, laser, manual welding and other standard industry used welding processes appropriate for the application of the substrate and manifold.

Benefits of this embodiment can include that the body of the tube stub plug is used as a rotational alignment aid to other seals on the substrate or manifold; no weld fixture needed to align the seal surfaces of the tube stub plug and the substrate; lower cost than a separately mounted body to the end of the substrate or manifold.

Figure 7A:
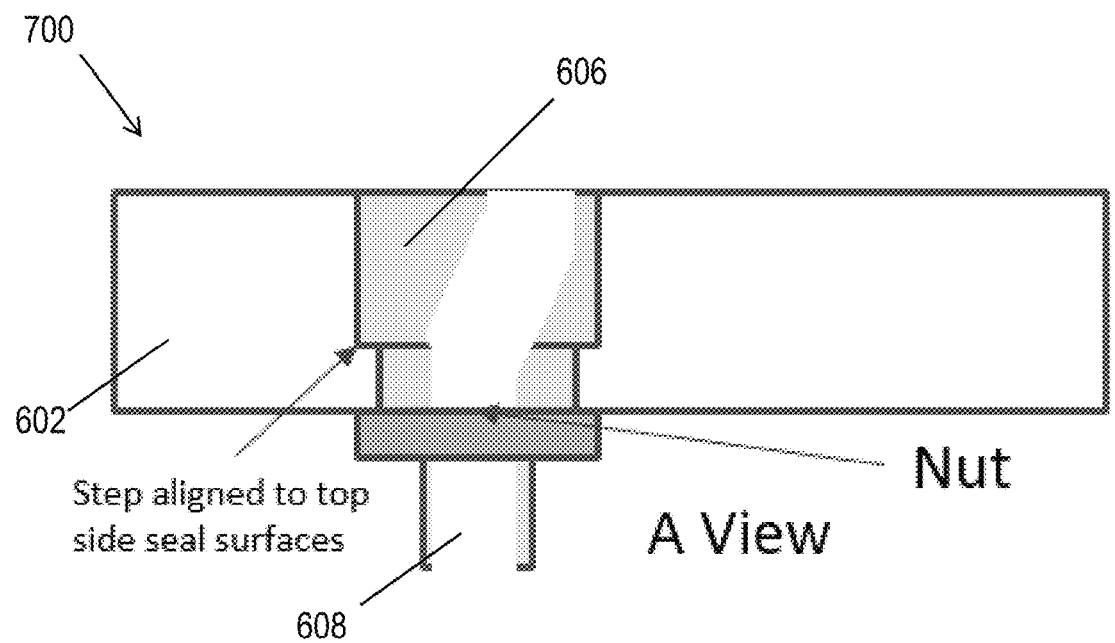
FIGS. 7A-B show an exemplary manifold with a tube stub plug with a stepped portion proximate the tube stub side of the manifold where the tube stub plug is secured to the manifold using a threaded connection, consistent with embodiments of the present disclosure.
Figure 7B:
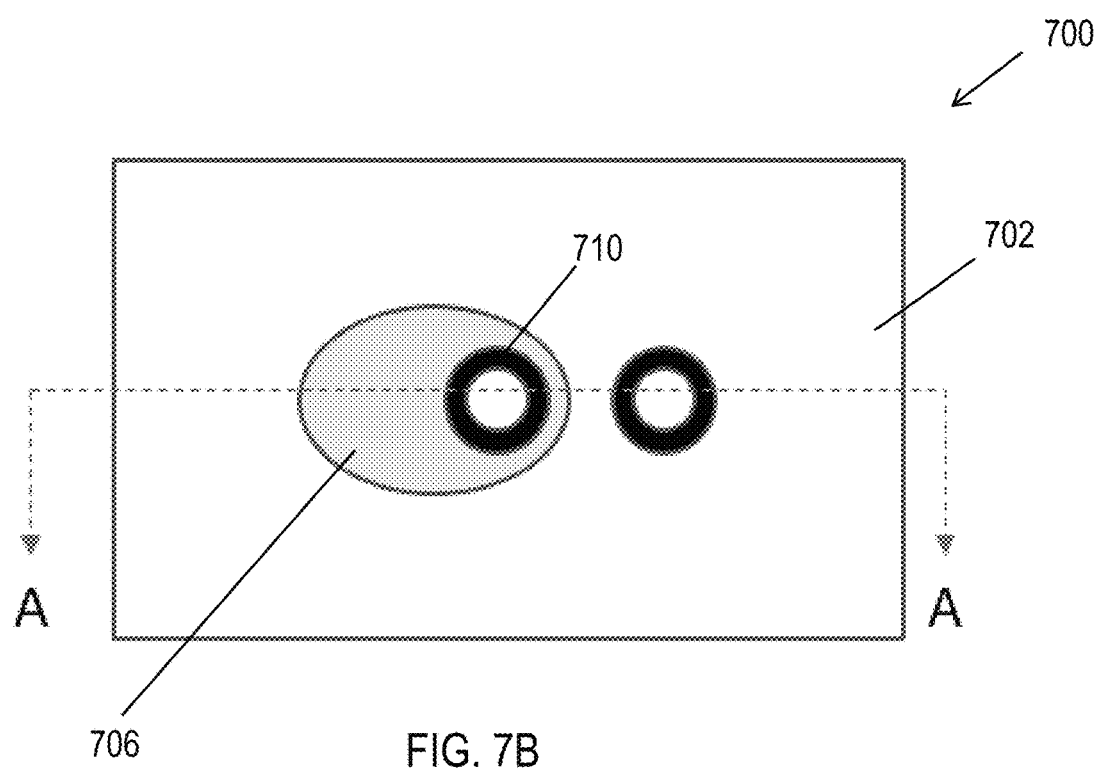

FIGS. 7A-B show an exemplary manifold with a tube stub plug with a stepped portion proximate the tube stub side of the manifold where the tube stub plug is secured to the manifold using a threaded connection, consistent with embodiments of the present disclosure. The seventh embodiment can include a manifold and tube stub plug assembly 700 with a manifold 702 including a tube stub plug opening 704 and a round or oval tube stub plug 706 with tube stub 708 on the one end and seal surface 710 on the other end with step on the tube side of the tube stub plug and a corresponding step in the manifold 702. The shape of the tube stub plug 706 can any suitable shape including, for example, oval, triangular, square, rectangular, or hexagonal with or without rounded corners. The shape of the tube stub plug 706 can be determined on a given application, including, for example, space considerations. A round tube stub plug can be used provided that it an anti-rotation feature (e.g., an anti-rotation pin, etc.) to align the angle of the seal port to other ports on the substrate or manifold. It should be noted that this arrangement can also be applied to holes/tube stubs in substrates (e.g., the term "substrate" can be substituted for "manifold" for anything described herein) that can be connected to the manifold 702 (not shown in FIGS. 7A-B).

The opening 704 for tube stub plug 706 can be machined through the manifold with step shelf at the bottom (tube stub 708) side of the tube stub plug 706. The tube stub plug 706 can have a threaded portion (hidden from view in FIGS. 7A-B) on the tube stub 708 side which can allow a nut 722 to secure the tube stub plug 706 to the manifold. Since the step 720 can be designed to position the top seal surface of the tube stub plug 706 with other seal surfaces, the nut 722 pulls the two parts together and there is less need for welding the tube stub plug to the substrate. In some embodiments, it may still be desirable to add tack welds or a continuous weld.

Benefits of this embodiment can include that the body of the tube stub plug is used as a rotational alignment aid to other seals on the substrate or manifold; no welding required; the configuration and shape of the tube stub plug can be changed to accommodate space considerations on the substrate and/or manifold; lower cost than a separately mounted body to the end of the substrate or manifold.

Figures 8A, 8B:
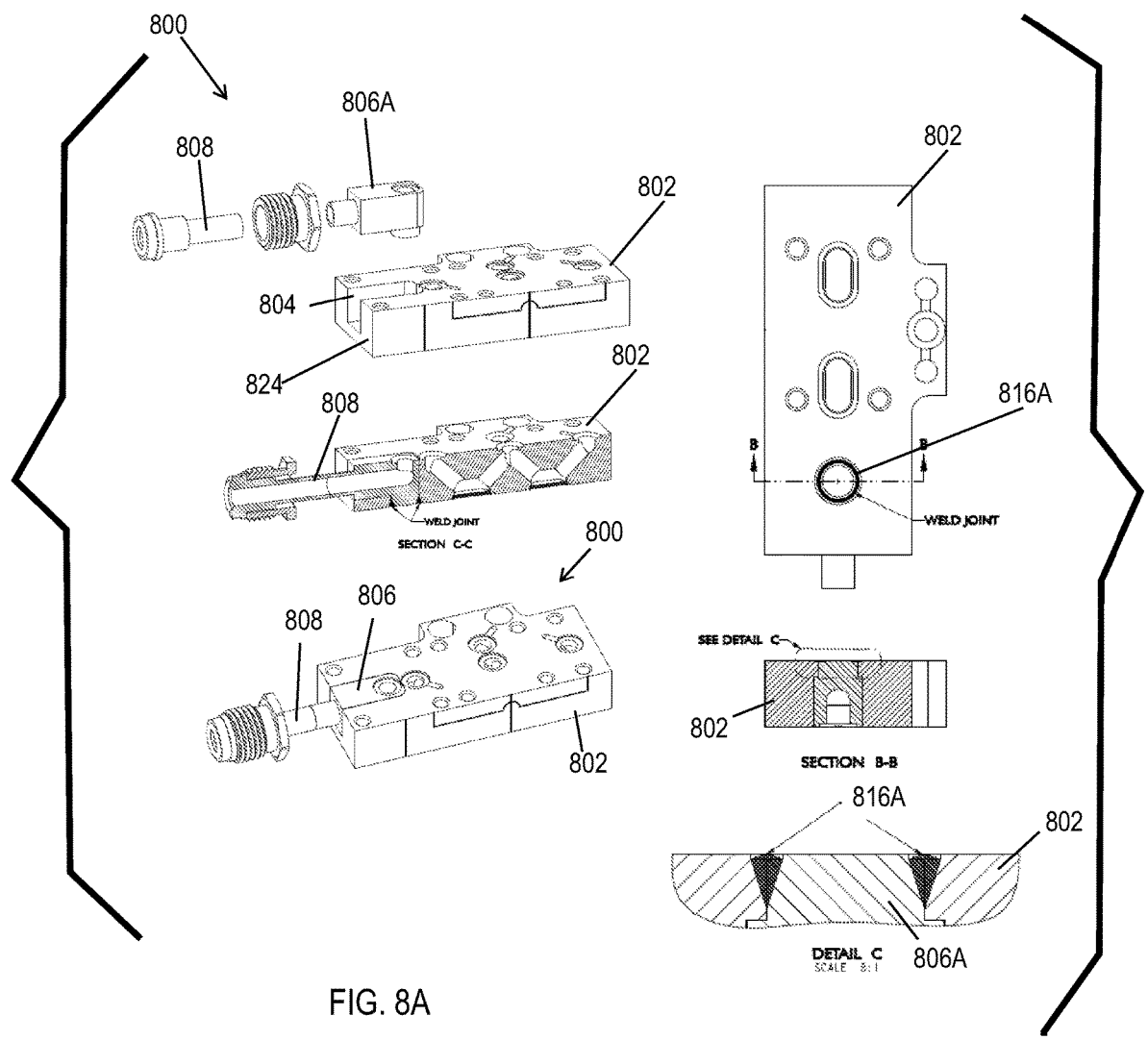
FIGS. 8A-F show exemplary tube stub plugs with a manifold, consistent with embodiments of the present disclosure.

FIGS. 8A-F show exemplary tube stub plugs with a manifold, consistent with embodiments of the present disclosure. The eighth embodiment can include a manifold and tube stub plug assembly 800 with a manifold 802 including a tube stub plug opening 804 and a tube stub plug 806A that is coupled with the opening 804 in the first surface 824 of the manifold where the tube stub 808 projects from the tube stub plug 806 at a right angle (i.e., a right angle tube stub, a side tube stub, a horizontal tube stub, etc.) from the first surface 824. In this embodiment, the tube stub plug 806A can be secured to the manifold using, for example, a welded joint 816A (see section C-C of FIG. 8A). FIG. 8B shows additional views of the tube stub plug 806A and the weld joint 816A. It should be noted that this arrangement can also be applied to holes/tube stubs in substrates (e.g., the term "substrate" can be substituted for "manifold" for anything described herein) that can be connected to the manifold 802 (not shown in FIGS. 8A-F).

Figure 8C:
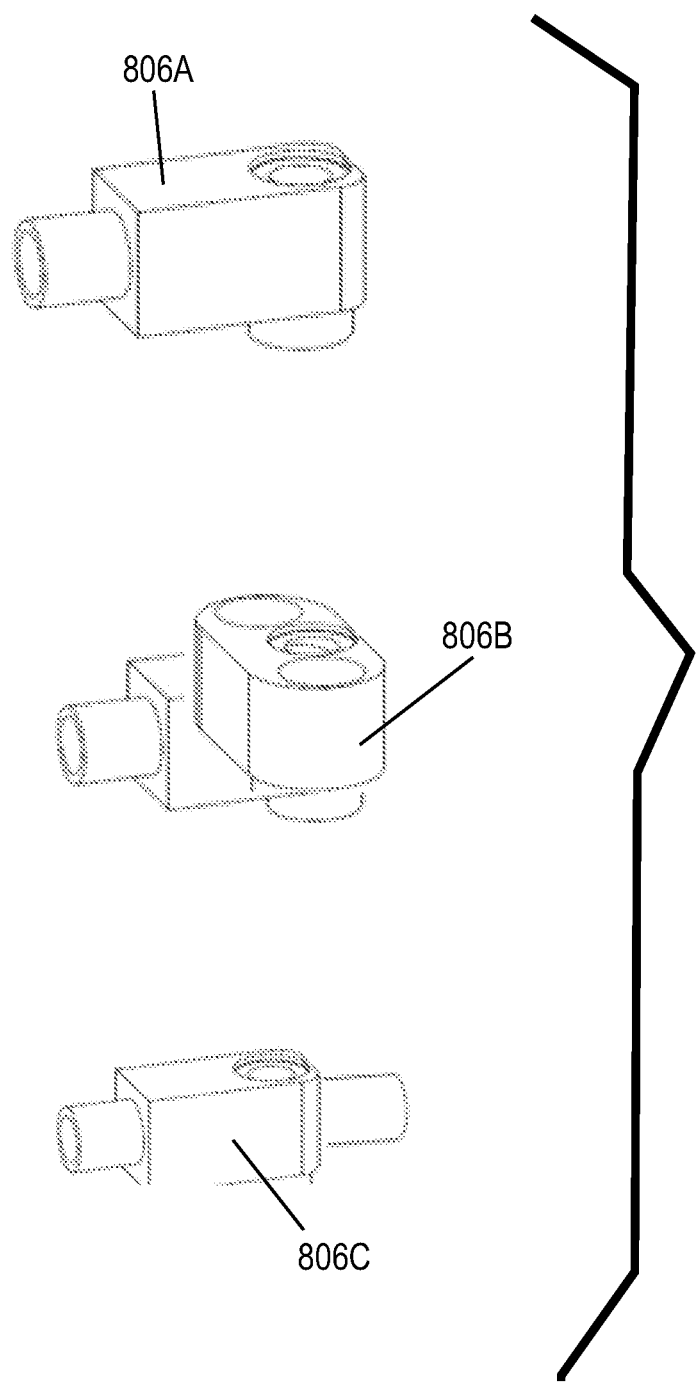

Other variations of the side tube stub are also possible. FIG. 8C shows different configurations of a side tube stub that can include, for example, a right angle side tube stub 806A, an offset horizontal tube stub 806B, and a straight horizontal tube stub 806C. The different embodiments can allow for a tube stub to be placed with the tube stub projecting from the top (i.e., first surface 824), bottom (i.e., second surface; not shown in FIGS. 8A-F), or any side (i.e., a third surface, a fourth surface, etc.; not shown in FIGS. 8A-F) of a manifold or any combination of surfaces.

Figure 8D:
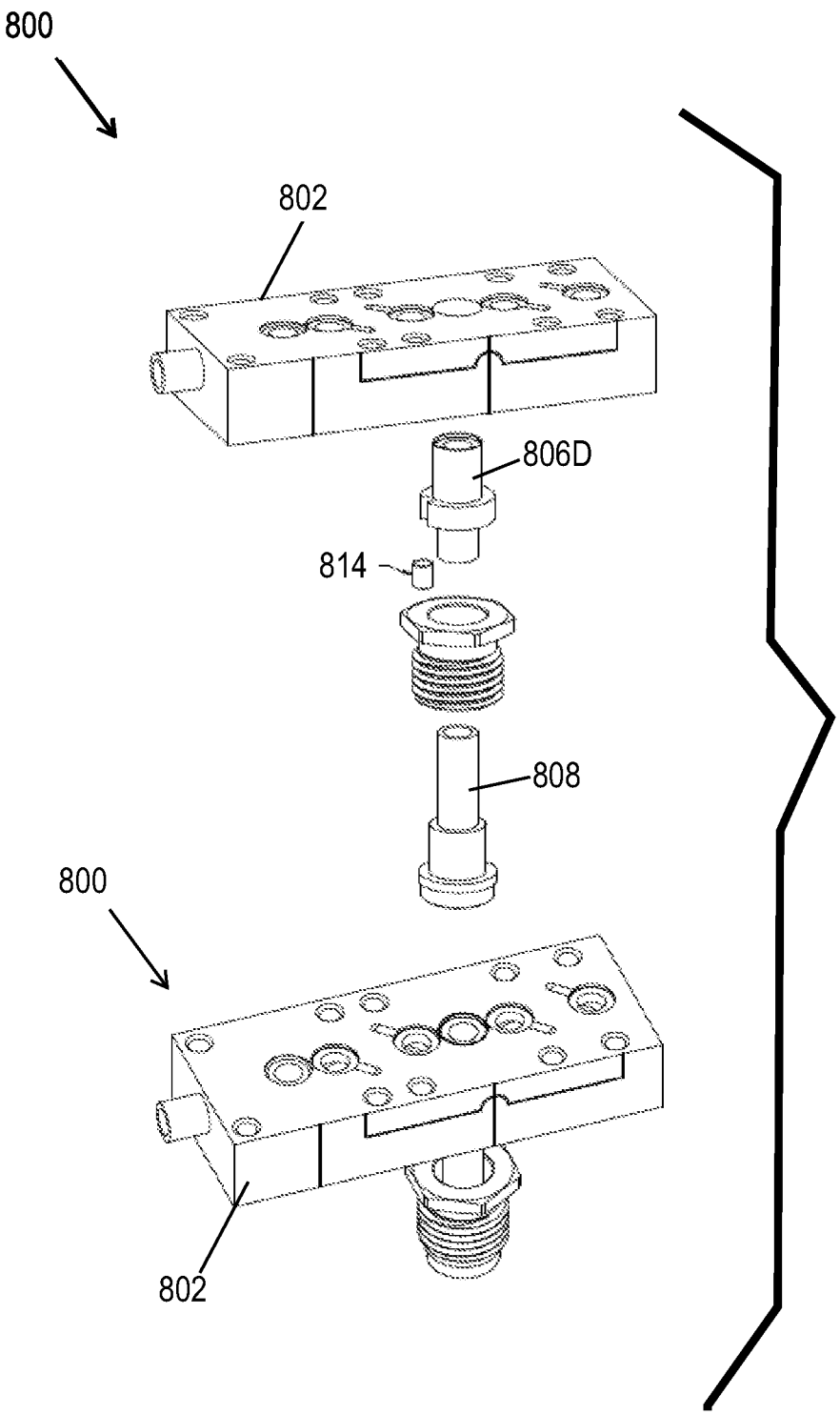
Figures 8E, 8F:
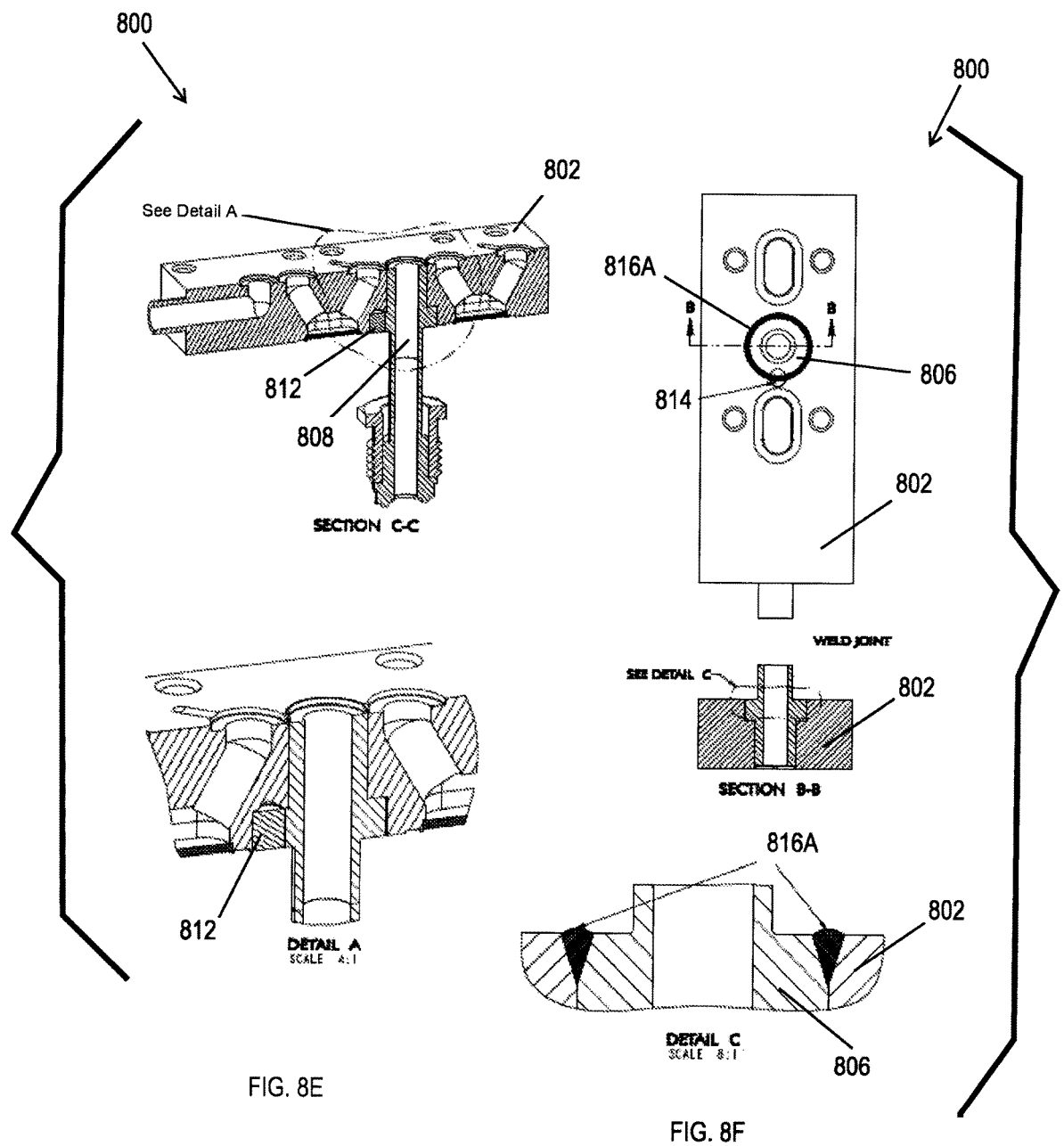

The tube stub can also be formed in a straight configuration designed for a bottom (or top) vertical mounting closer to the center of a substrate. FIG. 8D shows an exemplary bottom tube stub 806D for a bottom mount application (e.g., inserted into the manifold from the side opposite the seal surfaces. FIG. 8E shows cross-sectional views of the bottom mount tube stub 806D coupled with the manifold 802. FIG. 8F shows additional views of the bottom mount tube stub 806D with an anti-rotation pin 814 and a weld joint 816A securing the tube stub 806D to the manifold.

The various tube stubs can address the many different flow path inlet and outlet configurations required in surface mount fluid delivery systems. The basic configurations would be horizontal or vertical inlets and outlets within the fluid flow paths. The various tube stubs can be used for top, bottom, or side inlets and outlets within the fluid flow paths. Any suitable material can be used for the tube stubs including, for example, stainless steel, heavy metal alloys, polymers, etc. The tube stubs can be coupled with the manifolds/substrates using any suitable attachment technique and/or fastener, including screws, bolts, locking/press pins, welding, adhesive, friction, etc. The different embodiments described herein can allow for any of the tube stub configurations to be placed with the tube stub projecting from the top (i.e., first surface), bottom (i.e., second surface), or any side (i.e., a third surface, a fourth surface, etc.) of a substrate or any combination of surfaces.

As shown and described herein and in the incorporated patents/application, a manifold or substrate body can be formed from a solid block of material and have an associated weld cap, each of which may be formed from a suitable material (such as stainless steel) in accordance with the intended use of the flow substrate. Primarily for cost reasons, but also for those applications that warrant the use of non-metallic materials (such as where ionic contamination is a concern), the body and/or weld cap of the manifold or flow substrate may also be formed (e.g., molded or machined) from polymeric materials, such as plastic. The use of other materials, such as plastic, permits the flow substrate to be particularly well suited to chemical delivery applications or biological applications where ionic contamination is a concern, and/or applications where cost is a concern.

The weld cap can be coupled with the manifold or substrate body using adhesive (i.e., glue) or similar mechanism (e.g., industrial metal bonding or non-metal bonding glue to create a bonded joint). The adhesive can be applied to the manifold or substrate body, the weld cap, or both using any application method (e.g., spraying, taping, dispensing, brush etc.). This configuration can be used for coupling metal, plastic, composite and other non-metal applications that are not conducive to welding. The adhesive can be selected to be resistant to the type of material flowing through the system to allow for a leak-free coupling (i.e., joint, connection, etc.). A benefit of using adhesive to couple the weld cap to the manifold or substrate body includes the ability to create a leak-free coupling that is resistant to the material flowing through the system without the time and cost associated with welding the weld cap to the manifold or substrate body.

It will be appreciated that details of the foregoing embodiments, given for purposes of illustration, are not to be construed as limiting the scope of the present disclosure. Although several embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present disclosure.

What is claimed is:

1. A fluid substrate comprising:
   a manifold including, a top surface, a bottom surface, a circular opening and a tube stub plug hole;
   a tube stub plug comprising a seal surface, a tube stub, and a flow path,
   wherein the tube stub plug aligns with a top surface of the manifold, wherein the flow path runs through the tube stub plug from the seal surface to the tube stub,
   wherein a portion of the tube stub extends beyond an outer surface of the manifold, and
   wherein the tube stub plug is coupled with the manifold at the circular opening,
   wherein the tube stub plug further comprises an anti-rotation feature configured to prevent the tube stub plug from rotating with respect to the manifold.

2. The fluid substrate of claim 1, wherein the anti-rotation feature is included in the tube stub plug.

3. The fluid substrate of claim 2, wherein the anti-rotation feature runs through the tube stub plug.

4. The fluid substrate of claim 1, wherein the tube stub plug further comprises
   a circular shape and a tube stub plug through hole, and
   the anti-rotation feature comprises an element coupled with the tube stub plug through hole and couples the manifold and the tube stub plug.

5. The fluid substrate of claim 1, wherein the tube stub projects from the manifold at a right angle.

6. The fluid substrate of claim 1, wherein the tube stub plug is secured to the manifold using a threaded connection.

7. The fluid substrate of claim 1, wherein the tube stub plug further comprises a stepped portion adjacent the tube stub.

8. The fluid substrate of claim 1, wherein the tube stub plug further comprises a plurality of countersunk holes.

9. The fluid substrate of claim 8, further comprising a tack weld in each of the plurality of countersunk holes.

* * * * *